US012533811B2

(12) United States Patent
Jiang et al.

(10) Patent No.: US 12,533,811 B2
(45) Date of Patent: Jan. 27, 2026

(54) METHOD AND APPARATUS FOR CONTROL ROBOT TO PERFORM SOMERSAULT MOTION, AND ROBOT

(71) Applicant: Tencent Technology (Shenzhen) Company Limited, Guangdong (CN)

(72) Inventors: Xinyang Jiang, Shenzhen (CN); Yu Zheng, Shenzhen (CN); Shuai Wang, Shenzhen (CN); Haitao Wang, Shenzhen (CN); Jiafeng Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 138 days.

(21) Appl. No.: 18/309,263

(22) Filed: Apr. 28, 2023

(65) Prior Publication Data

US 2023/0264356 A1    Aug. 24, 2023

Related U.S. Application Data

(63) Continuation of application No. PCT/CN2022/093228, filed on May 17, 2022.

(30) Foreign Application Priority Data

May 31, 2021   (CN) .......................... 202110601860.0

(51) Int. Cl.
 *B62D 57/02*    (2006.01)
 *B25J 9/16*     (2006.01)
(52) U.S. Cl.
 CPC .......... *B25J 9/1679* (2013.01); *B25J 9/1605* (2013.01); *B25J 9/161* (2013.01); *B25J 9/1633* (2013.01); *B62D 57/02* (2013.01)

(58) Field of Classification Search
 None
 See application file for complete search history.

(56) References Cited

U.S. PATENT DOCUMENTS

2009/0039819 A1    2/2009  Wilson et al.
2012/0197435 A1*   8/2012  Maisonnier .......... B62D 57/032
                                                    901/1

FOREIGN PATENT DOCUMENTS

CN    102527055 A  *  7/2012
CN    205586558 U  *  9/2016
(Continued)

OTHER PUBLICATIONS

Office Action for corresponding Chinese application No. 202110601860.0 dated May 23, 2023, 3p, in Chinese language.
(Continued)

*Primary Examiner* — Arslan Azhar
(74) *Attorney, Agent, or Firm* — Crowell & Moring LLP

(57) ABSTRACT

A method for controlling a robot to perform a somersault motion enables the robot, when facing an obstacle such as a hole, ditch, or ravine, to cross the obstacle by performing a somersault motion. The robot includes a wheel-leg portion and a base portion connected via a joint. The robot receives a motion instruction and controls a torque of the joint to allow the robot to perform the somersault. During a takeoff phase of the somersault, a center of mass of the wheel-leg portion is lower than a center of mass of the base portion. During a flight phase, the center of mass of the wheel-leg portion is higher than the center of mass of the base portion at some point in time. During the landing phase, the center of mass of the wheel-leg portion is lower than the base portion. This can enable the robot to avoid obstacles.

20 Claims, 8 Drawing Sheets

(56) References Cited

FOREIGN PATENT DOCUMENTS

| | | | | |
|---|---|---|---|---|
| CN | 110281228 A | | 9/2019 | |
| CN | 110525535 A | * | 12/2019 | ........... B62D 57/028 |
| CN | 111776106 A | | 10/2020 | |
| CN | 112207825 A | | 1/2021 | |
| CN | 112698650 A | | 4/2021 | |
| CN | 113753146 A | | 12/2021 | |
| EP | 4 119 427 A1 | | 6/2021 | |
| JP | 2007-210100 A | | 8/2007 | |
| WO | WO 2022/252976 A1 | | 12/2022 | |

OTHER PUBLICATIONS

English language translation of Office Action for corresponding Chinese application No. 202110601860.0, 1p.

International Search Report for priority application No. PCT/CN2022/093228 dated Aug. 18, 2022, 4p, in English and Chinese languages.

International Search Report and Written Opinion for priority application No. PCT/CN2022/093228 dated Aug. 18, 2022, in Chinese language with English translation of the International Search Report, 12p.

Extended European Search Report for priority application PCT/CN2022/093228 dated May 22, 2024, 9p.

Zhang, Yanheng et al., "Design and Implementation of a Two-Wheel and and Hopping Robot with Linkage Mechanism", *IEEE Access*, vol. 6, Aug. 20, 2018, pp. 42422-42430.

Chen, Teng et al., "Optimized Method for Planning and Controlling the Somersault Motion of Quadruped Robot", *IEEE*, 2021 IEEE International Conference on Robotics and Automation ICRA , Jun. 4, 2021, 8p.

Chen, Hua et al., "Underactuated Motion Planning and Control for Jumping With Wheeled-Bipedal Robots", *IEEE*, IEEE Robotics and Automation Letters, vol. 6, No. 2, Apr. 2021, pp. 747-754.

Xiong, Xiaobin et al., "Sequential Motion Planning for Bipedal Somersault via Flywheel Slip and Momentum Transmission with Task Space Control", *Institute of Electrical and Electronics Engineers (IEEE)*, 2020 IEEE/Robotics Society of Japan Conference on Intelligent Robots and Systems (IROS), October 2020, pp. 3510-3517, US.

\* cited by examiner

METHOD AND APPARATUS FOR CONTROL ROBOT TO PERFORM SOMERSAULT MOTION, AND ROBOT

RELATED APPLICATION

This application claims priority as a continuation of PCT/CN2022/093228, filed May 17, 2022, published as WO2022252976A1, and entitled "METHOD AND DEVICE FOR CONTROLLING ROBOT TO PERFORM SOMERSAULT MOTION AND ROBOT" which claims priority to Chinese Patent Application No. 202110601860.0, filed on May 31, 2021 and entitled "METHOD FOR CONTROLLING ROBOT TO PERFORM SOMERSAULT MOTION, AND ROBOT", each of which are hereby incorporated herein by reference in their entirety.

FIELD OF THE TECHNOLOGY

This disclosure relates to the field of artificial intelligence and robotics, and specifically to a method and apparatus for controlling a robot to perform a somersault motion, and a robot.

BACKGROUND OF THE DISCLOSURE

As artificial intelligence (AI) and robotics technologies have been widely applied in civil and commercial fields, robots based on AI and robotics technologies play an increasingly important role in various scenarios such as intelligent transportation, smart homes, and the like.

Generally, motion control of a robot, especially a wheel-legged robot, involves control over a motion process (e.g., forward motion process) of a wheel-leg portion of the robot in the forward direction of the robot. For example, the robot is controlled to be at a target position or target velocity. However, the robot has no corresponding motion mode when facing an obstacle that cannot be avoided by the forward motion, such as a hole, ditch, trench, ravine, river, and the like.

SUMMARY

In view of the foregoing problems, the present disclosure provides a method for controlling a robot to perform a somersault motion, a robot, and a non-transitory computer-readable storage medium. By using the robot control method provided, the robot, when facing an obstacle that cannot be avoided by a forward motion can cross the obstacle by performing a somersault motion.

In some embodiments, a method for controlling a robot to perform a somersault motion is provided, the robot including a wheel-leg portion and a base portion connected to the wheel-leg portion, the wheel-leg portion including at least one joint, and the method including: receiving a motion instruction; and controlling a torque of the at least one joint according to the motion instruction to allow the robot to perform the somersault motion; in a takeoff phase of the somersault motion, a center of mass of the wheel-leg portion being lower than a center of mass of the base portion; in a flight phase of the somersault motion, there being a time at which the center of mass of the wheel-leg portion is higher than the center of mass of the base portion; and in a landing phase of the somersault motion, the center of mass of the wheel-leg portion being lower than the center of mass of the base portion.

In some embodiments, a robot is provided and includes: a wheel-leg portion including a plurality of joints; a base portion, the base portion being connected to the wheel-leg portion; and a controller, the controller being arranged on the robot, and configured to perform the foregoing method.

In some embodiments, an apparatus for controlling a robot to perform a somersault motion is provided and includes a processor and a memory, the memory storing at least one instruction, at least one program, a code set, or an instruction set, the at least one instruction, the at least one program, the code set, or the instruction set being loaded and executed by the processor to perform the foregoing method.

By using the method for controlling a robot to perform a somersault motion, the robot, and the non-transitory computer-readable storage medium provided by the present disclosure, the robot can better perform the somersault motion, thereby avoiding obstacles.

DESCRIPTION OF EMBODIMENTS

Figure 1:
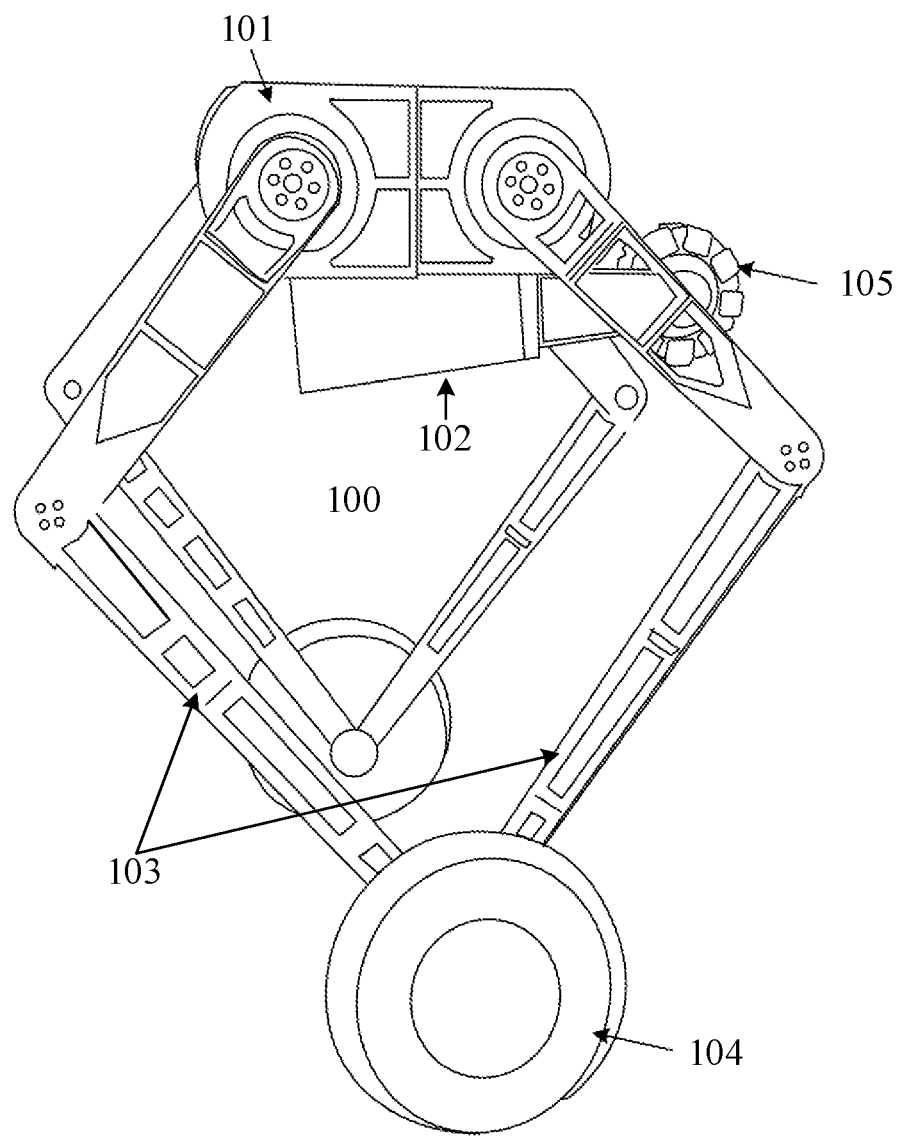
FIG. 1 shows a schematic structural diagram of an example robot including a left wheel-leg portion and a right wheel-leg portion that each has a single wheel-leg configuration according to some embodiments.

The following describes the solutions in the embodiments of the present disclosure with reference to the accompanying drawings in the embodiments of the present disclosure. The accompanying drawings and the following description show and describe some of the embodiments within the scope of this disclosure.

As shown in the present disclosure and the claims, words such as "a/an", "one", "one kind", and/or "the" may also include plural forms, unless the context expressly indicates an exception. In general, terms "comprise" and "include" merely indicate including clearly identified steps and elements. The steps and elements do not constitute an exclusive list. A method or a device may also include other steps or elements.

In addition, although the present disclosure makes various references to some modules in the system according to the embodiments of the present disclosure, any quantity of different modules may be used and run on a client and/or a server device. The modules are illustrative, and accordingly may vary.

In addition, flowcharts are used in the present disclosure for illustrating operations performed by the system according to the embodiments of the present disclosure. The foregoing or following operations may be performed in various order, for example in a reverse order, or some operation may be performed simultaneously. Additional operations may be added to the processes or one or more operations may be omitted.

AI involves a theory, a method, a technology, and an application system that use a digital computer or a machine controlled by a digital computer to simulate, extend, and expand human intelligence, perceive environments, obtain knowledge, and use knowledge to obtain an optimal result. In other words, AI is a comprehensive technology in computer science, which attempts to understand the essence of intelligence and produces a new intelligent machine that can react in a manner similar to human intelligence. AI is to study design principles and implementation manners of various intelligent machines, to enable the machine to have the functions of perception, reasoning, and decision-making.

The technical solution of the present disclosure relates to robotics technology in AI technology, especially robot intelligent control. A robot is a type of mechanical and electronic device which takes advantages of mechanical transmission and modern microelectronic technology and can imitate a skill. The robot is developed on the basis of electronic, mechanical and information technologies. The robot can complete tasks and commands given by humans, but does not have to like a human. The robot is a type of automatic machine, which has intelligent abilities similar to human or biological, such as perception ability, planning ability, motion ability and coordination ability. The robot is an automatic machine with high flexibility. As computer technology and artificial intelligence technology advance, the robot has been greatly improved in function and technology level, typical representatives of which include mobile robots as well as robot vision and touch technologies.

The present disclosure relates to an application of AI in robot control. Specifically, the present disclosure provides a robot control method based on AI. The control method enhances the control of the somersault motion of the robot, and determines the torque of each joint and the drive forces of the wheels based on comprehensive consideration of the whole-body dynamics and the set of constraint equations of the robot, thereby realizing the control of the somersault motion of the robot.

The robot may include a base portion and a wheel-leg portion with active wheels (such as feet as the active wheels). The wheel-leg portion with active wheels enables a wheel-legged robot to walk or navigate using the wheel. In some embodiments, the wheel-legged robot may further include a controllable tail, which may be configured to balance the wheel-legged robot and assist the wheel-legged robot to move. For example, the tail can assist the motion of the wheel-legged robot in a flight phase. In some embodiments, the wheel-legged robot may further include controllable mechanical arms, which may be configured to perform tasks, such as lifting or picking objects. The wheel-legged robot may include a bipedal wheel-legged robot, a four-leg wheel-legged robot, and or any other suitable wheel-legged robot.

Based on the above, the present disclosure provides a robot control method. The robot according to the present disclosure can realize autonomic motion control. The robot includes a wheel-leg portion, including at least one joint. The wheel-leg portion refers to a wheeled component used by the robot to realize motion. In some embodiments, the wheel-leg portion includes a left wheel-leg portion and a right wheel-leg portion. The left wheel-leg portion and the right wheel-leg portion each includes at least one joint.

For example, the left wheel-leg portion and the right wheel-leg portion each includes an active wheel, and a leg portion that is connected to a central shaft of the active wheel and is configured to realize motion control of the active wheel. The active wheel may have an active wheel configuration of a single wheel, two wheels, four wheels, and the like. Each active wheel may be controlled by two leg portions connected in parallel or a plurality of leg portions connected in series. The embodiments of the present disclosure are not limited to a type of the left wheel-leg portion and the right wheel-leg portion or a number of the active wheels.

For example, the left wheel-leg portion and the right wheel-leg portion may include the same number of joints and have the same joint configuration. Alternatively, in some embodiments, the left wheel-leg portion and the right wheel-leg portion may include different numbers of joints and have different joint configurations. The embodiments of the present disclosure are not limited to a number of joints and joint configurations of the left wheel-leg portion and the right wheel-leg portion.

In some embodiments, the robot may further include a base portion connected to the wheel-leg portion, and an additional component arranged on the base portion. The base portion refers to a main body portion of the robot, for example, the trunk of the robot. The base portion may be a plane plate-shaped component or a cuboid-shaped component connected to the wheel-leg portion of the robot. In addition, the base portion may be connected to the wheel-leg portion via a bracket. The foregoing description merely provides a structural example of an example robot, and the embodiments of the present disclosure.

The robot control method includes: during a somersault motion of the robot, controlling at least one joint in the wheel-leg portion (and the active wheels), to allow the robot to perform the somersault motion. In a takeoff phase of the somersault motion, a center of mass of the wheel-leg portion is lower than a center of mass of the base portion; in a flight phase of the somersault motion, there is a time at which the center of mass of the wheel-leg portion is higher than the center of mass of the base portion; and in the landing phase of the somersault motion, the center of mass of the wheel-leg portion is lower than the center of mass of the base portion.

Based on the above, the embodiments of the present disclosure improve the motion ability of the robot through the joint control of each joint and the control of the torque of the active wheels of the robot. In particular, the present disclosure can control the robot to perform the somersault in the air in some embodiments so that the robot jumps to a further position with its configuration remaining unchanged, thereby realizing obstacle avoidance or other task requirements.

In some embodiments, the left wheel-leg portion and the right wheel-leg portion each has a single wheel-leg configuration. The single wheel-leg configuration means that the corresponding wheel-leg portion includes a single active wheel. FIG. 1 shows a schematic structural diagram of an example robot including a left wheel-leg portion and a right wheel-leg portion that each has the single wheel-leg configuration. In the following, the single wheel-leg configuration is described with reference to FIG. 1.

As shown in FIG. 1, it shows a schematic structural diagram of a robot. The bipedal wheel-legged robot 100 may include: a base portion 101, a wheel-leg portion 103, and active wheels 104 in the wheel-leg portion 103. An end of the wheel-leg portion 103 is connected to the base portion 101, and the other end of the wheel-leg portion 103 is connected to the active wheels 104. The base portion 101 is equipped with a power output apparatus (such as a motor), which may be configured to supply power to drive joints in the wheel-leg portion 103. The wheel-leg portion 103 has a parallel leg structure (two legs of the bipedal wheel-legged robot 100 are balanced), including five joints and having two rotational degrees of freedom. A height of a center of mass of the wheel-leg portion and a height of a center of mass of the base portion may be adjusted by adjusting each joint in the wheel-leg portion 103.

For example, compared with a serial leg structure, the parallel leg structure has stronger rigidity, and therefore can withstand an impact in a motion (such as somersault motion, jumping, and the like) having a flight phase. When in contact with the ground, the active wheels 104 provide the wheel-legged robot 100 with sliding motion capability. In some embodiments, the bipedal wheel-legged robot 100 may further include an additional component 102, which is connected to the base portion 101. A passive wheel 105 may be arranged on the additional component 102. The additional component 102 includes one rotational degree of freedom. The motion of the additional component 102 affects the change of the base portion 101 and the wheel-leg portion 103, such as driving the base portion, to allow it to have a rotational speed. Therefore, balance and pose control of the robot 100 may be realized by adjusting a position of the additional component 102.

Referring to FIG. 1, the wheel-leg portion 103 of the robot 100 includes a left wheel-leg portion and a right wheel-leg portion. The left wheel-leg portion and the right wheel-leg portion each includes an active wheel, and two parallel leg portions that are connected to a central shaft of the active wheel and configured to realize motion control of the active wheel. For example, the left wheel-leg portion includes a left active wheel, and a first left wheel-leg portion and a second left wheel-leg portion connected in parallel; and the right wheel-leg portion includes a right active wheel, and a first right wheel-leg portion and a second right wheel-leg portion connected in parallel. As shown in FIG. 1, the left wheel-leg portion and the right wheel-leg portion are in mirror symmetry.

In the present disclosure, by setting each of the left wheel-leg portion and the right wheel-leg portion to have the single wheel-leg configuration, during the motion of the two-wheeled robot (including two active wheels, corresponding to that the left wheel-leg portion and the right wheel-leg portions each has the single leg configuration), the control over the motion process of the wheel-leg portion of the robot in a vertical direction is enhanced. On one hand, the rotational degree of freedom of the joints of the robot is increased, so that the robot can realize a variety of task functions through different poses and positions. For example, a distance between the center of mass of the wheel-leg portion and the center of mass of the base portion of the robot can be changed by the left wheel-leg portion or the right wheel-leg portion. In addition, the joints in the wheel-leg portion of the robot and any of the active wheels can be controlled so as to allow the robot to perform the somersault motion, thereby realizing obstacle avoidance or other tasks. On the other hand, through the joint control of each joint of the robot and the control of the torques of the active wheels of the robot, the robot can have improved motion capacity, and thereby being able to move along a predetermined somersault motion trajectory with minimum energy consumption.

Figure 2A:
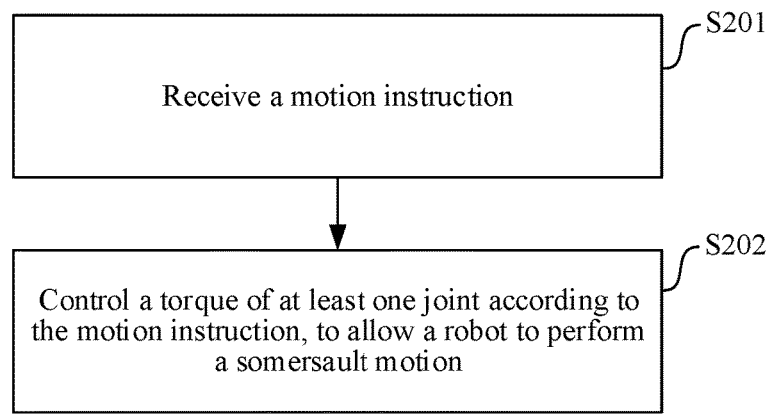
FIG. 2A shows a schematic flowchart of a robot control method according to some embodiments.
Figure 2B:
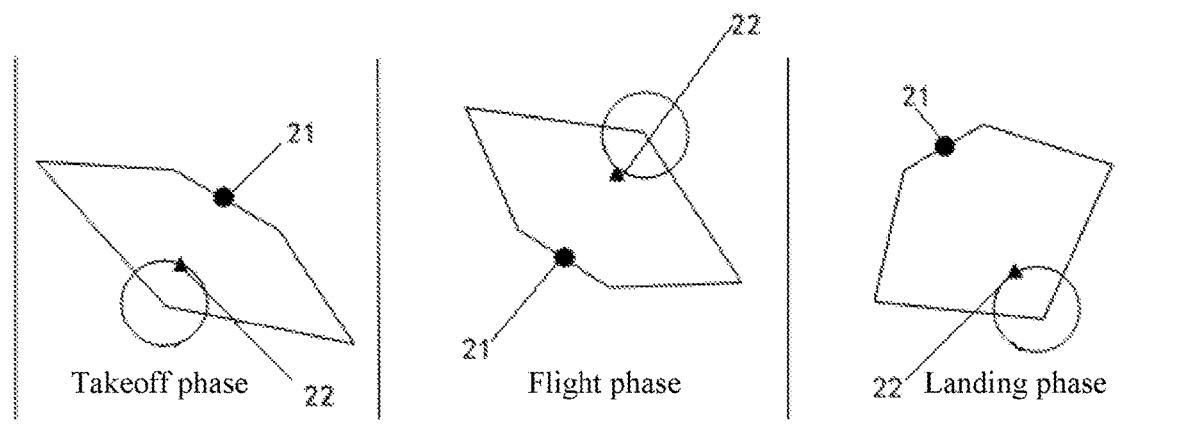
FIG. 2B shows a schematic diagram of an example robot in a somersault motion according to some embodiments.

FIG. 2A shows a schematic flowchart of a robot control method 200 according to some embodiments of the present disclosure. FIG. 2B shows a schematic diagram of a robot in a somersault motion according to some embodiments of the present disclosure. In the following, the robot control method is described with referenced to FIG. 2A and FIG. 2B. For example, the robot may be the robot 100 as shown in FIG. 1. The robot includes the wheel-leg portion and the base portion connected to the wheel-leg portion, and the wheel-leg portion includes at least one joint.

Referring to FIG. 2A, in step S201, a motion instruction is received. In step S202, a torque of the at least one joint is controlled according to the motion instruction, to allow the robot to perform the somersault motion. In a takeoff phase of the somersault motion, the center of mass of the wheel-leg portion is lower than the center of mass of the base portion; in a flight phase of the somersault motion, there is a time at which the center of mass of the wheel-leg portion is higher than the center of mass of the base portion; and in a landing phase of the somersault motion, the center of mass of the wheel-leg portion is lower than the center of mass of the base portion.

Referring to FIG. 2B, the center of mass 21 of the base portion is shown in a small black circle, and the center of mass 22 of the wheel-leg portion is shown in a small black triangle. In the takeoff phase and the landing phase, the center of mass 22 of the wheel-leg portion is lower than the center of mass 21 of the base portion, and the active wheels in the wheel-leg portion are always in contact with a bearing surface. Although the center of mass 22 of the wheel-leg portion is controlled to be lower than the center of mass 21 of the base portion in the takeoff phase and the landing phase, the distance between the center of mass 21 of the base portion and the center of mass 22 of the wheel-leg portion may vary with the motion pose and the motion progress of the robot. For example, in the takeoff phase, the distance between the two centers of mass may be decreased and then increased, so as to produce a large vertical upward acceleration after the takeoff phase, thereby ensuring the robot to cross a high obstacle height. For example, in the landing phase, the distance between the two centers of mass may be gradually decreased, to cushion impact when landing. In the flight phase, there is a time at which the center of mass 22 of the wheel-leg portion is higher than the center of mass 21 of the base portion, so that the robot can have a greater rotational angular velocity in this phase, thereby successfully completing the somersault motion and crossing a long distance.

Referring to FIG. 2B, during the somersault, the joints in the wheel-leg portion that are connected to the base portion are controlled by an electronic drive apparatus (which may also be referred to as a motor) in the base portion, so that different rotational angles and rotational accelerations are generated. In some embodiments, an included angle between links (if any) in the wheel-leg portion may vary to form different poses. Therefore, by the electronic drive apparatus in the base portion outputting different torques, the poses of the robot during the somersault can be realized, so as to realize the somersault motion control of the robot. The robot is enabled to stably and smoothly complete the somersault motion, thereby avoiding obstacles.

Figure 3A:
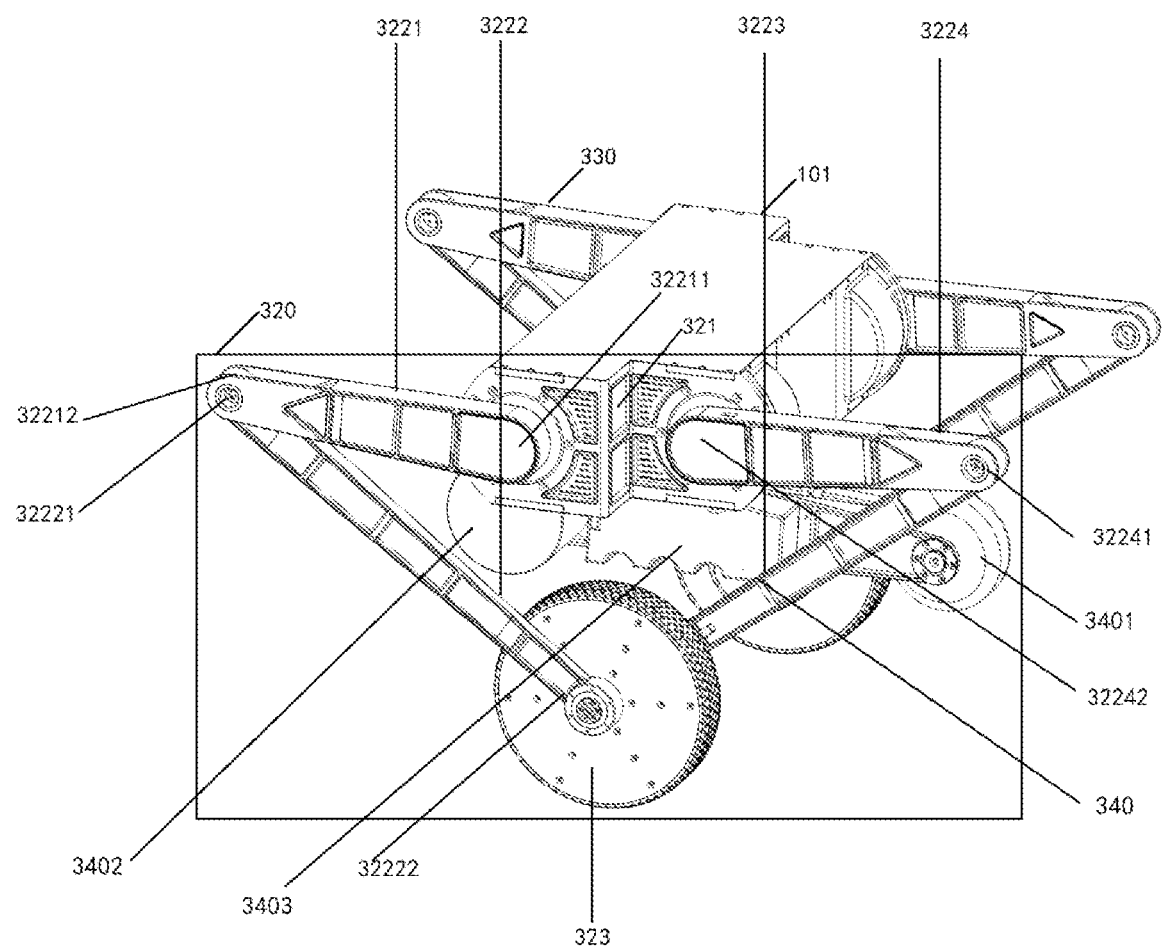
FIG. 3A shows a schematic diagram of a three-dimensional structure of an example robot according to some embodiments.
Figure 3B:
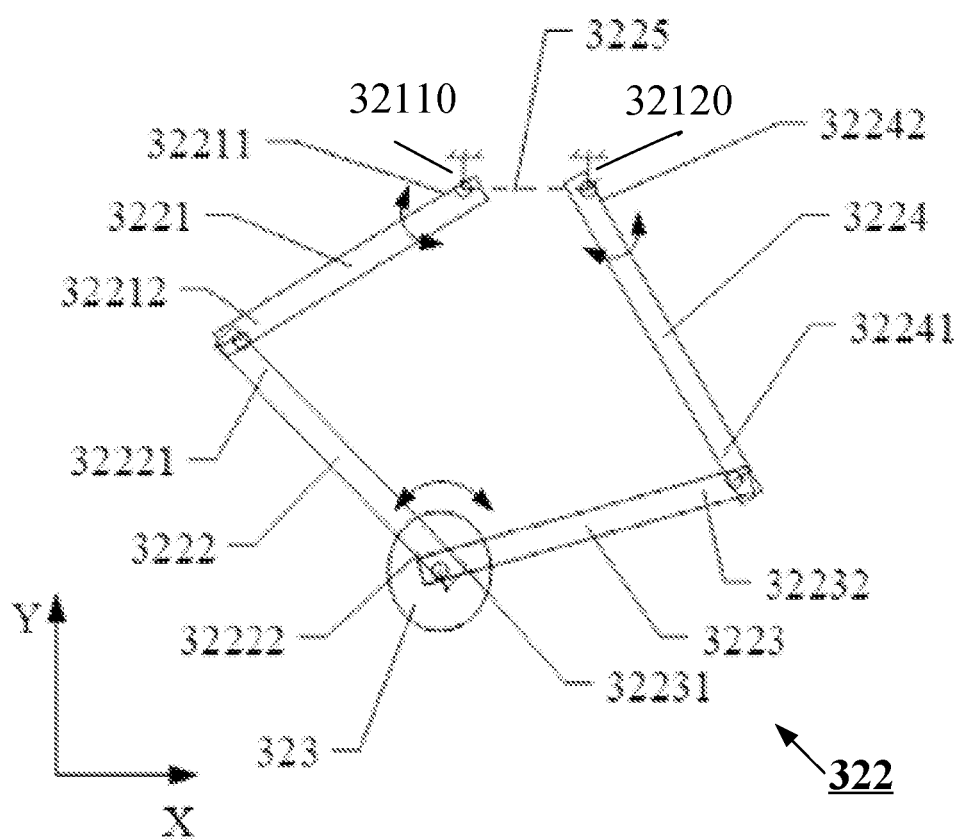
FIG. 3B shows a simplified schematic diagram of an example wheel-leg portion of a robot according to some embodiments.

In the following, the configuration of the robot is further described with reference to FIG. 3A and FIG. 3B, in order to describe how to realize the somersault motion control of the robot with this configuration. FIG. 3A is a three-dimensional structural diagram of the robot 100 according to at least one embodiment of the present disclosure. FIG. 3B is a simplified schematic diagram of the wheel-leg portion of the robot according to at least one embodiment of the present disclosure.

For example, as shown in FIG. 3A, the robot provided by at least one embodiment of the present disclosure includes the base portion 101, and the left wheel-leg portion 320 and the right wheel-leg portion 330 constituting the wheel-leg portion 103. For example, a motion plane of the left wheel-leg portion 320 is parallel to a motion plane of the right wheel-leg portion 330. For example, the left wheel-leg portion 320 and the right wheel-leg portion 330 are in mirror symmetry.

The left wheel-leg portion 320 and the right wheel-leg portion 330 being in mirror symmetry refers to that there is a plane about which the left wheel-leg portion 320 and the right wheel-leg portion 330 are symmetrical. In addition, since the left wheel-leg portion 320 and the right wheel-leg portion 330 are mechanisms with parameters, their structural states may change. Therefore, in the embodiments of the present disclosure, the structural states of the left wheel-leg portion 320 and the right wheel-leg portion 330 are not limited to be always in mirror symmetry. For example, in an initial mounting state, the left wheel-leg portion 320 and the right wheel-leg portion 330 are in mirror symmetry; however, as the left wheel-leg portion 320 and the right wheel-leg portion 330 perform asynchronous motions, the left wheel-leg portion 320 and the right wheel-leg portion 330 may not be in mirror symmetry.

For example, the left wheel-leg portion 320 and the right wheel-leg portion 330 may have the same structure. Alternatively, the robot provided by at least one embodiment of the present disclosure may further include more leg mechanisms, such as four parallel leg mechanisms. Except for the left wheel-leg portion 320 and the right wheel-leg portion 330, the remaining parallel leg mechanisms may have the same or mirror-symmetrical structures as the left wheel-leg portion 320 and the right wheel-leg portion 330. The number of the leg mechanisms may vary.

For example, the left wheel-leg portion 320 and the right wheel-leg portion 330 are respectively mounted at two ends of the base portion 101. The mounting positions of the left wheel-leg portion 320 and the right wheel-leg portion 330 on the base portion 101 may vary. The left wheel-leg portion 320 and the right wheel-leg portion 330 each includes at least one joint, and each has the single wheel-leg configuration. In the following, the structure and the joints of the parallel leg mechanisms of the robot are described with the left wheel-leg portion 320 as an example.

For example, as shown in FIG. 3A, the left wheel-leg portion 320 includes a power output apparatus 321, which is configured to control the joint in the wheel-leg portion that is connected to the base portion. The left wheel-leg portion 320 further includes a linkage assembly 322 (referring to FIG. 3B) and the left active wheel 323.

For example, as shown in FIG. 3A, the power output apparatus 321 includes a first motor and a second motor. The first motor includes a first left leg rotation shaft, and the second motor includes a second left leg rotation shaft. The first left leg rotation shaft and the second left leg rotation shaft are arranged in parallel. The power output apparatus 321 is configured to drive the linkage assembly to move.

Since the first left leg rotation shaft and the second left leg rotation shaft are arranged in parallel, the linkage assembly can realize planar motion.

For example, as shown in FIG. 3A, the robot further includes an additional component 340, which is configured for balance control. The additional component 340 includes an additional active wheel 3402, a first additional link 3403, an additional passive wheel 3401, and a second additional link (not shown). The additional active wheel 3402 is fixedly connected to the base portion 101. The combination of the first additional link and the second additional link is called an additional link.

With reference to FIG. 3B, the linkage assembly 322 includes a first left leg link 3221, a second left leg link 3222, a third left leg link 3223, and a fourth left leg link 3224. The first left leg link 3221 and the second left leg link 3222 form the first left wheel-leg portion; the third left leg link 3223 and the fourth left leg link 3224 form the second left wheel-leg portion. The first left wheel-leg portion is in parallel connection with the second left wheel-leg portion.

A first end portion 32211 of the first left leg link 3221 is fixedly connected with the first left leg rotation shaft of the first motor. A second end portion 32212 of the first left leg link 3221 and a first end portion 32221 of the second left leg link 3222 are hinged with each other, and have the same rotation axis, to form a first left leg revolute. A second end portion 32222 of the second left leg link 3222 and a first end portion 32231 of the third left leg link 3223 are hinged with each other, and have the same rotation axis, to form a second left wheel revolute. A second end portion 32232 of the third left leg link 3223 and a first end portion 32241 of the fourth left leg link 3224 are hinged with each other, and have the same rotation axis, to form a third left wheel revolute. A second end portion 32242 of the fourth left leg link 3224 is fixedly connected with the second left leg rotation shaft of the second motor. In this way, the power output apparatus 321 can control the pose of the left wheel-leg portion 320 by driving the linkage assembly to move.

For example, as shown in FIG. 3B, the first end portion 32211 of the first left leg link 3221 is connected with the first left leg rotation shaft of the first motor through a flange, and the second end portion 32242 of the fourth left leg link 3224 is connected with the second left leg rotation shaft of the second motor through a flange. In this way, the first motor and the second motor can respectively drive the first left leg link 3221 and the fourth left leg link 3224 to rotate. Alternatively, the first left leg link and the first motor, or the fourth left leg link and the second motor may be connected by other means such as a coupling. For example, the left active wheel 323 and the second left wheel revolute are hinged with each other, and have the same rotation axis. For example, as shown in FIG. 3B, the first motor and the second motor may output different torques at the same time, which allows the robot to maintain motion balance during the somersault and generates a corresponding motion speed.

For example, the first left leg link 3221, the second left leg link 3222, the third left leg link 3223, the fourth left leg link 3224, and a connecting line 3225 (dotted line in the figure, which may be called a base link 3225) between a center of the first left leg rotation shaft 32110 and a center of the second left leg rotation shaft 32120 together form a planar five-link mechanism. The first end portion 32211 of the first left leg link 3221 (or the first left leg rotation shaft) and the second end portion 32242 of the fourth link (or the second left leg rotation shaft) are fixed in a XY plane. In addition, the first left leg link 3221 is rotatable around the first left leg rotation shaft 32110 under the driven action of the first left leg rotation shaft, and the fourth left leg link 3224 is rotatable around the second left leg rotation shaft under the driven action of the second left leg rotation shaft. Therefore, in the planar five-link mechanism, the first left leg link 3221 and the fourth left leg link 3224 are driving links, the second left leg link 3222 and the third link 3223 are driven links, and the base link 3225 (the connecting line 3225 between the center of the first left leg rotation shaft 32110 and the center of the second left leg rotation shaft 32120, which is the broken line in the figure) is a fixed link.

For example, the first left leg link 3221 and the fourth left leg link 3224 are located in the same plane perpendicular to an axis of the left active wheel 323. In a direction perpendicular to the axis of the left active wheel 323, the second left leg link 3222 is located between the first left leg link 3221 and the left active wheel 323; the third left leg link 3223 is located at a side of the left active wheel 323 away from the second left leg link 3222; a third motor is fixedly connected with the third left leg link 3223, and is located at a side of the third left leg link 3223 away from the left active wheel 323.

In the direction perpendicular to the axis of the left active wheel 323, the relative positions of the first left leg link, the second left leg link, the third left leg link and the fourth left leg link are interchangeable, as long as the planar five-link mechanism can be formed. For example, the third left leg link 3223 may be located at a side of the second left leg link 3222 close to the left active wheel 323. The third motor may be fixedly connected to the second left leg link 3222, and located at a side of the second left leg link 3222 away from the left active wheel 323.

Similar to the left wheel-leg portion, the right wheel-leg portion includes: a first right leg link, a second right leg link, a third right leg link, and a fourth right leg link. A first end portion of the first right leg link is connected with the base portion. A second end portion of the first right leg link is hinged with a first end portion of the second right leg link, to form a first right leg revolute. A second end portion of the second right leg link is connected with the right active wheel. A first end portion of the third right leg link is connected with the right active wheel. A second end portion of the third right leg link is hinged with a first end portion of the fourth right leg link, to form a second right leg revolute. A second end portion of the fourth right leg link is connected with the base portion. The right wheel-leg portion may have a similar configuration and motion mode with the left wheel-leg portion.

As described above, the robot 100 has the foregoing mechanical structure, and there is a linkage relationship between the joints. The motion instruction may include additional information to allow the robot to better complete the somersault motion (such as flipping to a desired height and jumping to a desired distance with less energy consumption).

In order to further control the robot with the foregoing mechanical structure, an equivalent model of the robot may be designed based on the foregoing mechanical structure. For example, the robot may be equivalent to different multi-rigid body models. In some embodiments, these multi-rigid body models may be further simplified to plane models. For example, the multi-rigid body models may be a variable-leg-length wheeled inverted pendulum model, and another embodiment of the multi-rigid body models may be a plane-with-floating-base whole-body dynamic model. The model type may vary. In the following, the variable-leg-length wheeled inverted pendulum model is described with reference to FIG. 4, and the plane-with-floating-base whole-body dynamic model is described with reference to FIG. 5.

For example, the motion instruction includes target motion parameters corresponding to different times in the somersault motion of the robot, so as to allow the robot to move along a target trajectory. Further, the motion instruction is obtained through whole-body dynamics planning. The whole-body dynamics may further plan the motion instruction based on the variable-leg-length wheeled inverted pendulum model and/or the plane-with-floating-base whole-body dynamic model, so that the robot can move along the target trajectory at each time in the motion.

For example, the whole-body dynamics planning may correspond to a dynamic model and a set of constraint equations of the robot. The dynamic model and the set of constraint equations of the robot are associated with a somersault initial target state and a somersault final target state.

For example, the whole-body dynamics control may be based on the set of constraint equations corresponding to the robot. The set of constraint equations includes at least one of the following: a motion state equation, configured for constraining that a motion between the robot and the bearing surface in the takeoff phase and the landing phase is pure rolling, and configured for constraining that there is no interactive force between the robot and the bearing surface in the flight phase; a friction constraint equation, configured for constraining that a bearing surface reaction force meets a friction cone; an anti-collision constraint equation, configured for constraining the mechanisms of the wheel-legged robot other than the active wheel from colliding with the bearing surface; a boundary constraint equation, configured for constraining an upper limit value and a lower limit value of a state quantity of the wheel-legged robot, and an upper limit value and a lower limit value of a control quantity of the wheel-legged robot, a state quantity constraint being configured for constraining the state quantity of the wheel-legged robot; and a continuity constraint equation, configured for constraining an inelastic collision between the wheel-legged robot and the bearing surface in the landing phase.

For example, the set of constraint equations further includes: a joint control constraint, configured for constraining a constraint relationship between a motion state corresponding to the robot and a motion state of each joint of the robot.

For example, step S202 may further include: determining an actual control signal for controlling the at least one joint, based on the whole-body dynamics control and according to parameter differences between actual motion parameters of the robot in the somersault motion and the target motion parameters, to regress the actual motion parameters of the robot toward the target motion parameters.

Figure 4:
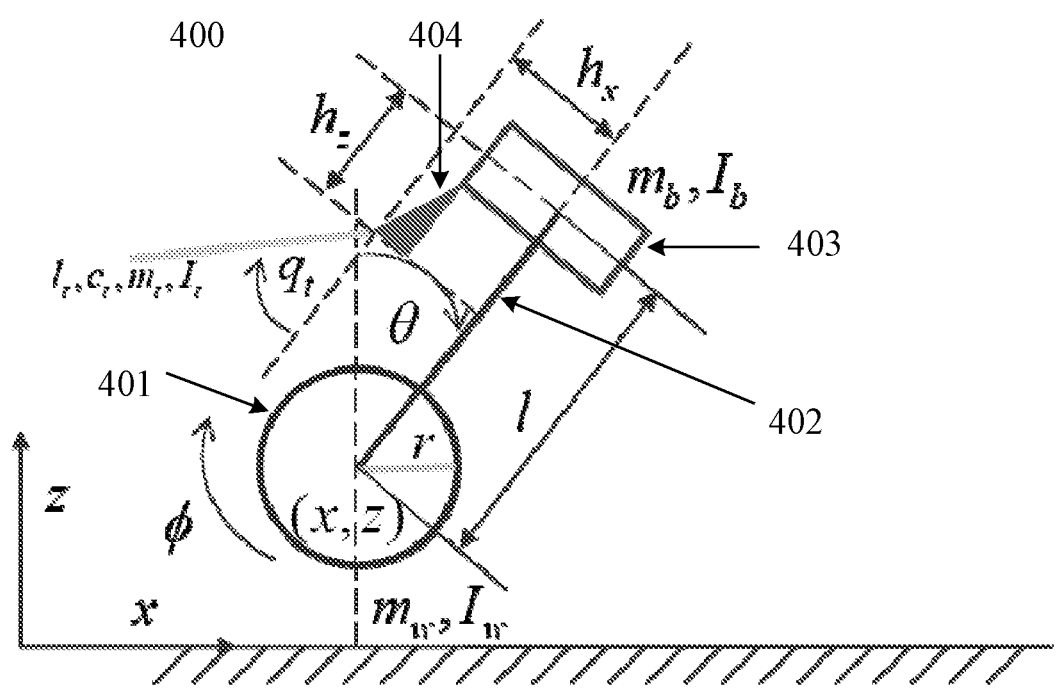
FIG. 4 shows a schematic diagram of a variable-leg-length wheeled inverted pendulum model according to some embodiments.
Figure 5:
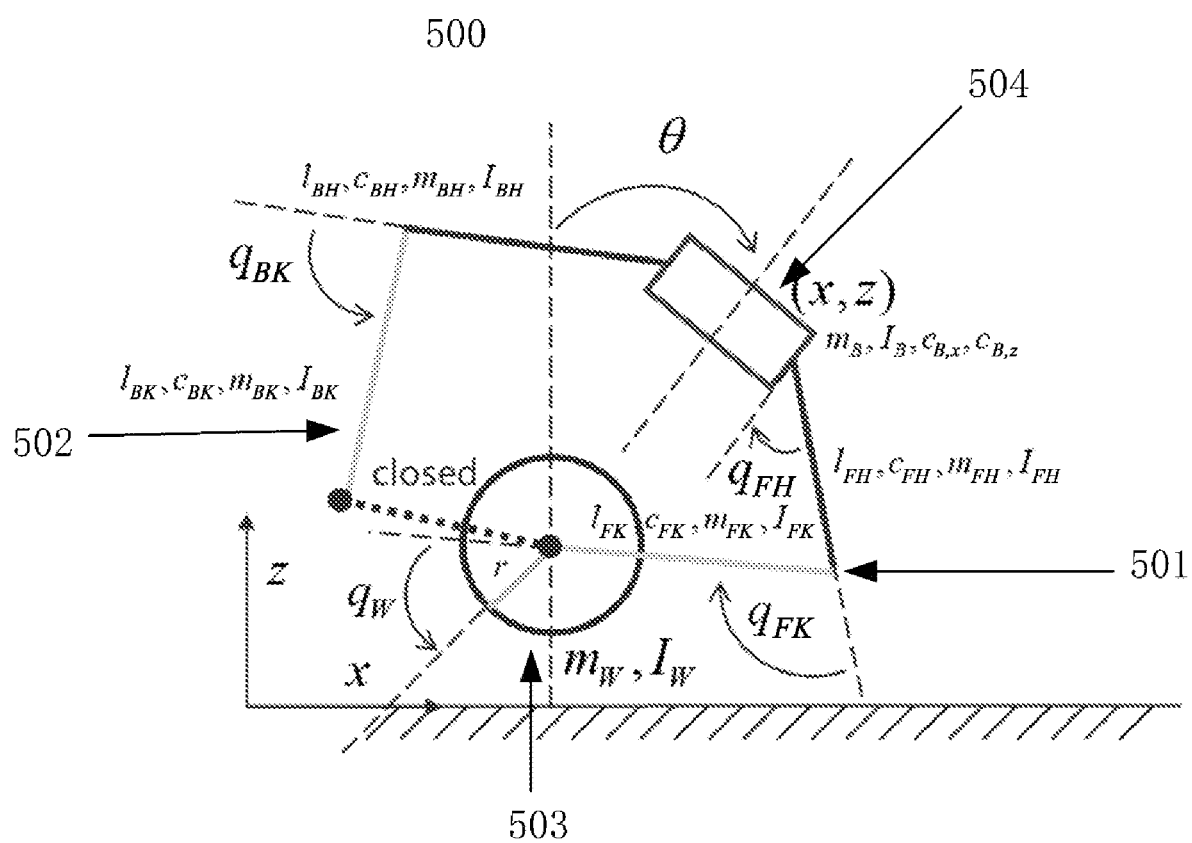
FIG. 5 shows a schematic diagram of an example plane-with-floating-base whole-body dynamic model according to some embodiments.

In the following, with reference to FIG. 6 and FIG. 8, how to design the set of constraint equations and the dynamic model corresponding to the models as shown in FIG. 4 and FIG. 5 in each phase of the somersault motion, and how to use the set of constraint equations and the dynamic model to design the motion instruction are described, so as to regress the actual motion parameters of the robot toward the target motion parameters.

FIG. 4 shows a variable-leg-length wheeled inverted pendulum model 400 provided by some embodiments of the present disclosure.

As described above, in some embodiments, the motion instruction is designed based on the variable-leg-length wheeled inverted pendulum model 400. The variable-leglength wheeled inverted pendulum model includes: a virtual leg 402 with a variable leg length, a virtual active wheel 401 connected to a first end of the virtual leg 402, and a virtual base portion 403 connected to a second end of the virtual leg. With referenced to FIG. 3A and FIG. 3B, the virtual leg 402 is equivalent to the joints and the links in the wheel-leg portion, the virtual active wheel 401 is equivalent to the active wheels in the wheel-leg portion, and the virtual base portion 403 is equivalent to the base portion. The robot as shown in FIG. 3A and FIG. 3B can adjust the position (such as the height) of the base portion by adjusting the joints in the wheel-leg portion. Since the wheel-leg portion is relatively light, the virtual leg 402 may be represented as a retractable rod, that is, the position (such as the height) of the base portion can be changed by adjusting a length of the rod. The virtual base portion is simplified to a single rigid body.

In some embodiments, the variable-leg-length wheeled inverted pendulum model 400 further includes a virtual tail 404, which is equivalent to the additional component. The virtual tail may be used as a floating base, so that the robot can be simplified to a plane model with a floating base, thereby reducing complexity of the motion planning problem. If the additional component is fixed, the additional component and the base portion may be simplified to a single rigid body. If the additional component moves, the additional component may be used as a rigid body connected to the base portion. The additional component may be configured to adjust the pose of the robot. In some embodiments, the additional component may be used to adjust balance of the robot during the motion of the robot.

Therefore, for example, referring to FIG. 4, the dynamic model corresponding to the variable-leg-length wheeled inverted pendulum model may be constructed based on at least one of the following: a center position (x, z) of the virtual active wheel, a rotated angle $\phi$ of the virtual active wheel in a world coordinate system, a leg length 1 of the virtual leg, a pitch angle $\theta$ of the virtual base portion in the world coordinate system, an execution torque $\tau_w$ of the virtual active wheel, a force for changing the leg length of the virtual leg (such as a force of a linear change), a friction force $f_{cx}$ and a support force $f_{cz}$ of the bearing surface to the variable-leg-length wheeled inverted pendulum model. The bearing surface may refer to a plane that provides support for the robot, such as the ground in a real scene. In some embodiments, the world coordinate system in which a horizontal direction is flush with the bearing surface and a vertical direction is perpendicular to the bearing surface can be established. The motion, position, pose, and the like of the robot may be described based on the world coordinate system. In some embodiments, the world coordinate system may be set at a start position of the motion of the robot.

Further, the dynamic model corresponding to the variable-leg-length wheeled inverted pendulum model may be constructed based on at least one of the following: a mass $m_w$ and an inertia $I_w$ of the active wheel 401, a radius r of the active wheel 401, a total mass $m_b$ and a total inertia $I_b$ of the base portion 403 and the additional component 404, relative positions $h_x$ and $h_z$ of the centers of the additional component 404 and the base portion 403, a mass $m_t$ and an inertia $I_t$ of the additional component 404, a distance $c_t$ from a center of mass to a drive joint of the additional component 404, a length $I_t$ and a rotated angle $q_t$ of the additional component 404.

The generalized coordinates may include a position parameter (such as the position of the active wheel), a rotation parameter (such as the rotated angle of the active wheel), and the like of the variable-leg-length wheeled inverted pendulum model. A pose (namely position and pose) of the variable-leg-length wheeled inverted pendulum model can be described using these parameters. For example, the relationship between the foregoing parameters in the world coordinate system and the generalized coordinate system may be described in the following manner.

When there is no additional component, the generalized coordinates may be expressed as follows:

$$q=(x,z,\phi,l,\theta)^T \qquad \text{Equation (4-1)}$$

Where q is the generalized coordinates of the variable-leg-length wheeled inverted pendulum model.

The control quantity may be expressed as follows:

$$u=(\tau_w,f_l)^T \qquad \text{Equation (4-2)}$$

Where u is the control quantity of the variable-leg-length wheeled inverted pendulum model, $\tau_w$ is the execution torque of the virtual active wheel 401, and $f_l$ is a main power of the virtual leg 402.

The bearing surface reaction force may be expressed as follows:

$$f_c=(f_{cx},f_{cz})^T \qquad \text{Equation (4-3)}$$

Where $f_c$ is the bearing surface reaction force of the variable-leg-length wheeled inverted pendulum model.

When there is an additional component, the generalized coordinates may be expressed as follows:

$$q=(x, z, \phi, l, \theta, q_t)^T \qquad \text{Equation (4-4)}$$

The control quantity may be expressed as follows:

$$u=(\tau_w, f_l, \tau_t)^T \qquad \text{Equation (4-5)}$$

Where $\tau_w$ is the execution torque of the virtual active wheel 401, $f_l$ is the main power of the virtual leg 402, and $\tau_t$ is an execution torque of a drive motor of the virtual tail 404.

The bearing surface reaction force may be expressed as follows:

$$f_c=(f_x, f_z)^T \qquad \text{Equation (4-6)}$$

In the following, according to the foregoing relationship, construction processes of the dynamic model corresponding to the variable-leg-length wheeled inverted pendulum model in the takeoff phase, the flight phase and the landing phase are described with reference to FIG. 6 to FIG. 8.

FIG. 5 shows a plane-with-floating-base whole-body dynamic model 500 provided by some embodiments of the present disclosure.

In some embodiments, the motion instruction is designed based on the plane-with-floating-base whole-body dynamic model 500. The plane-with-floating-base whole-body dynamic model includes a virtual front leg 501, a virtual back leg 502, a virtual active wheel 503 connected with a first end of the virtual front leg and a first end of the virtual back leg, and a virtual base portion 504 connected with a second end of the virtual front leg and a second end of the virtual back leg. The virtual front leg and the virtual back leg are equivalent to the joints and the links in the wheel-leg portion. The virtual active wheel is equivalent to the active wheels in the wheel-leg portion. The virtual base portion is equivalent to the base portion.

In some examples, the plane-with-floating-base whole-body dynamic model further includes a virtual tail (not shown), which is equivalent to the additional component. The virtual tail may be used as a floating base, so that the robot can be simplified to a plane model with a floating base, thereby reducing complexity of the motion planning problem.

For example, when the plane-with-floating-base whole-body dynamic model does not include the virtual tail, the virtual base portion may be simplified to a single rigid body. Since the wheel-leg portion is relatively light, the wheel-leg portion may be simplified to two motion chains, and the two motion chains are closed at the virtual active wheel. When the robot includes the additional component and the additional component is fixed, the additional component and the base portion may be simplified to a single rigid body. When the robot includes the additional component and the additional component moves, the additional component may be used as a rigid body connected to the base portion.

Therefore, the dynamic model corresponding to the plane-with-floating-base whole-body dynamic model may be constructed based on at least one of the following: a center position of the virtual base portion, a rotated angle of the virtual active wheel, a pose of the virtual front leg, a pose of the virtual back leg, a pitch angle of the virtual base portion, an execution torque of the virtual active wheel, a rotational torque at a connection between the virtual legs and the virtual base portion, a friction force and a support force of the bearing surface to the plane-with-floating-base whole-body dynamic model.

For example, referring to FIG. 5, the lower-left corner of the figure is the established world coordinate system, (x, z) is the position of the center of the virtual base portion in the world coordinate system, θ is the pitch angle of the virtual base portion in the world coordinate system, and $m_B$, $I_B$, $C_{B,x}$, $C_{B,z}$ are a total mass and a total inertia of the virtual base portion and the virtual tail, a offset of a center of mass of the robot relative to a central point of the virtual base portion.

The virtual front leg includes a virtual front thigh and a virtual front calf. The virtual back leg includes a virtual back thigh and a virtual back calf. $m_{FH}$, $I_{FH}$, $C_{FH}$, $l_{FH}$, $q_{FH}$ respectively represent a mass of the virtual front thigh, an inertia of the virtual front thigh, a position of a center of mass of the virtual front thigh relative to the joint, a length of the virtual front thigh, and a rotated angle of the virtual front thigh. Similarly, $m_{FK}$, $I_{FK}$, $C_{FK}$, $l_{FK}$, $q_{FK}$, $m_{BH}$, $I_{BH}$, $C_{BH}$, $l_{BH}$, $q_{BH}$, and $m_{BK}$, $I_{BK}$, $C_{BK}$, $l_{BK}$, $q_{BK}$ represent related variables of the virtual front calf, the virtual back thigh, and the virtual back calf. $m_w$, $I_w$, $q_w$, $r$ respectively represent a mass, an inertia, a rotated angle, and a radius of the virtual active wheel. The dashed line between the ends of the virtual front calf and the virtual back calf in the figure indicates that the two points are coincided in the actual motion, and a length of the dashed line is 0, forming a closed-loop constraint.

For example, the relationship between the foregoing parameters in the world coordinate system and the generalized coordinate system may be described in the following manner.

When there is no additional component, the generalized coordinates may be expressed as follows:

$$q=(x, z, \theta, q_{FH}, q_{FK}, q_{BH}, q_{BK}, q_w)^T \qquad \text{Equation (5-1)}$$

Where q is the generalized coordinates of the plane-with-floating-base whole-body dynamic model.

The control quantity may be expressed as follows:

$$u=(\tau_{FH}, \tau_{BH}, \tau_w)^T \qquad \text{Equation (5-2)}$$

Where u is the control quantity of the plane-with-floating-base whole-body dynamic model, $\tau_w$ is the execution torque of the virtual active wheel 503, $\tau_{FH}$ is an execution torque of the joint of the virtual front thigh and the virtual base portion, and $\tau_{BH}$ is an execution torque of the joint of the virtual back thigh and the virtual base portion.

The bearing surface reaction force may be expressed as follows:

$$f_c=(f_{c,x}, f_{c,z})^T \qquad \text{Equation (5-3)}$$

Where $f_c$ is the bearing surface reaction force of the plane-with-floating-base whole-body dynamic model.

A closed-loop force may be expressed as follows:

$$f_L=(f_{L,x}, f_{L,z})^T \qquad \text{Equation (5-4)}$$

Where $f_{L,x}$, $f_{L,z}$ are the closed-loop forces in the x-direction and the z-direction respectively.

Similarly, when there is the additional component, the relationship between the parameters corresponding to the plane-with-floating-base whole-body dynamic model may be further designed with reference to the relevant equations for designing the virtual tail as shown in FIG. 4.

In the following, according to the foregoing relationship, construction processes of the dynamic model corresponding to the plane-with-floating-base whole-body dynamic model in the takeoff phase, the flight phase and the landing phase are described with reference to FIG. 6 to FIG. 8.

The following describes in stages, how to realize, under the assumptions of the two different models, the control during the somersault motion by controlling the joints and designing the motion instruction.

Figure 6:
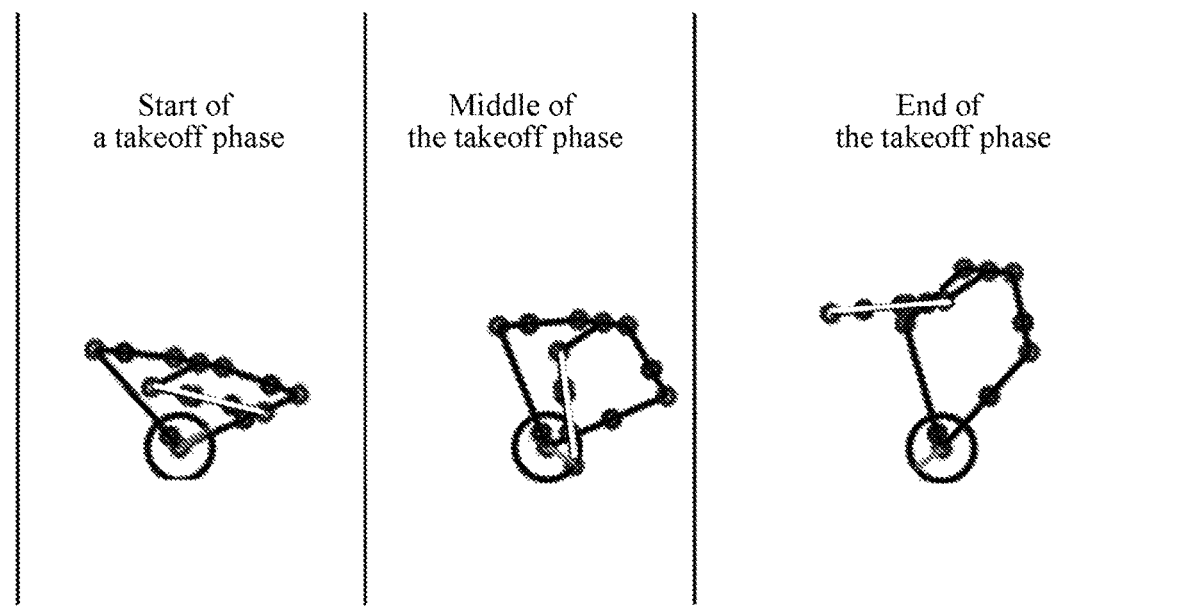
FIG. 6 shows a schematic diagram of an example robot in a takeoff phase according to some embodiments.

Referring to FIG. 6, the motion state of the robot during the takeoff and how to realize the motion control during the takeoff by controlling the joints are described.

As shown in FIG. 6, in the takeoff phase of the somersault motion, the joints in the wheel-leg portion that are connected to the base portion and the active wheels in the wheel-leg portion may be controlled by the motion instruction, so as to allow the central axis of the robot to be inclined to the horizontal direction corresponding to the takeoff direction. For example, in some embodiments, at a start of the takeoff phase, the motion instruction may instruct to control the active wheels to rotate in a direction opposite to the takeoff direction, so that the robot backs up and its upper body is tilted, thereby making preparation for subsequent acceleration in a direction.

For example, through the control of the active wheels in the wheel-leg portion by the motion instruction, the robot may accelerate in a horizontal positive direction corresponding to the takeoff direction. For example, in some embodiments, at a middle of the takeoff phase, the motion instruction may instruct to control the active wheels to rotate in the same direction as the takeoff direction. As such the robot is able to accelerate in the horizontal positive direction corresponding to the takeoff direction, to ensure a large forward acceleration when jumping off the ground, which helps to cross obstacles.

For example, the joints in the wheel-leg portion that are connected to the base portion are controlled by the motion instruction, so as to allow the robot to accelerate vertically upward and accelerate in the horizontal positive direction corresponding to the takeoff direction. For example, in some embodiments, at an end of the takeoff phase, the motion instruction controls the power output apparatus in the base portion, to adjust the first left leg link and the fourth left leg link to rotate in a direction away from each other, thereby realizing the effect of extending legs.

In some embodiments, the white stick as shown in FIG. 6 indicates the additional component. The motion mode of the additional component may be correspondingly controlled.

In order to design the motion instruction that can realize the foregoing control mode, the corresponding dynamic model and the set of constraint equations may be further designed according to the variable-leg-length wheeled inverted pendulum model and the plane-with-floating-base whole-body dynamic model.

When the motion instruction is designed according to the variable-leg-length wheeled inverted pendulum model as shown in FIG. 4, the dynamic model corresponding to the variable-leg-length wheeled inverted pendulum model in the takeoff phase may be constructed in the following manner.

Based on the generalized coordinates and the generalized velocity, a total kinetic energy E and a total potential energy V corresponding to the robot are calculated, and the Lagrangian of the system may be expressed as L=E-V. In the takeoff phase, the robot includes an internal force and an external force (such as the bearing surface reaction force). According to the Lagrangian Equation, the dynamic model corresponding to the takeoff phase may be obtained as follows:

$$D(q)\ddot{q}+C(q,\dot{q})\dot{q}+G(q)=S^t u+J_c^T f_c \quad \text{Equation (4-7)}$$

Where q represents the generalized coordinates, $\dot{q}$ represents the generalized velocity corresponding to the generalized coordinates, $\ddot{q}$ represents a generalized acceleration corresponding to the generalized coordinates, u represents the control quantity of the robot, D represents an inertia matrix, C represents a centrifugal force and a Coriolis force vector, G represents a gravity vector, $$S = \begin{bmatrix} \frac{\partial(\phi-\theta)}{\partial q} & \frac{\partial l}{\partial q} \end{bmatrix}^T$$

represents a selection matrix, and $$J_C = \begin{bmatrix} \frac{\partial(x-r\phi n_{C,2})}{\partial q} & \frac{\partial(z+r\phi n_{C,1})}{\partial q} \end{bmatrix}^T$$

represents a Jacobian matrix of a contact point between the virtual active wheel and the bearing surface of the robot, $n_c=[n_{c,1}\ n_{c,2}]^T$ represents a unit outer normal vector of the contact point between the virtual active wheel and the bearing surface, $n_{c,1}$ and $n_{c,2}$ represent parameters in the unit outer normal vector.

In the takeoff phase, it is assumed that there is pure rolling between the virtual active wheel and the bearing surface, an acceleration of the contact point between the virtual active wheel and the bearing surface in the world coordinate system is as follows:

$$J_c \ddot{q}+\dot{J}_c \dot{q}=0 \quad \text{Equation (4-8)}$$

By combining Equation (4-7) and Equation (4-8), the following is obtained:

$$\begin{bmatrix} D(q) & -J_C^T \\ J_C & 0 \end{bmatrix}\begin{bmatrix} \ddot{q} \\ f_C \end{bmatrix} = \begin{bmatrix} S^T u - C(q,\dot{q})\dot{q} - G(q) \\ -\dot{J}_C \dot{q} \end{bmatrix} \quad \text{Equation (4-9)}$$

Since D(q) is a square matrix and full rank, and $J_c$ is full row rank, it can be determined that the first item on the left side of Equation (4-9) is full rank. Then, the generalized acceleration and bearing surface reaction force may be expressed as follows:

$$\begin{bmatrix} \ddot{q} \\ f_C \end{bmatrix} = \begin{bmatrix} D(q) & -J_C^T \\ J_C & 0 \end{bmatrix}^{-1} \begin{bmatrix} S^T u - C(q,\dot{q})\dot{q} - G(q) \\ -\dot{J}_C \dot{w} \end{bmatrix} = Ab \quad \text{Equation (4-10)}$$

The state quantity of the robot is taken as $x=[q^T\ \dot{q}^T]^T$, and the dynamic constraint equation in the takeoff phase may be expressed as follows:

$$x = \begin{bmatrix} \dot{q} \\ \ddot{q} \end{bmatrix} = \begin{bmatrix} \dot{q} \\ A_{up}b \end{bmatrix} \quad \text{Equation (4-11)}$$

Where $A_{up}$A is the first n rows of a matrix A, b is a matrix, n is the number of parameters in the generalized coordinates of the robot, $\dot{x}$ is a derivative of the state quantity of the robot, q is the generalized coordinates, $\dot{q}$ is the generalized velocity corresponding to the generalized coordinates, and $\ddot{q}$ is the generalized acceleration corresponding to the generalized coordinates.

Further, at any time t in the takeoff phase, the dynamic constraint equation may be expressed as follows:

$$\dot{x}(t) = \begin{bmatrix} \dot{q}(t) \\ \ddot{q}(t) \end{bmatrix} = \begin{bmatrix} \dot{q}(t) \\ A(t)_{up}b(t) \end{bmatrix} \quad \text{Equation (4-12)}$$

A derivation process of the friction constraint equation may be as follows.

Based on the assumption of pure rolling, the bearing surface reaction force meets a friction cone constraint. By linearizing the bearing surface reaction force, the friction constraint equation is obtained, which may be expressed as follows:

$$\begin{bmatrix} (-\mu n_C + o_C)^T \\ (-\mu n_C - o_C)^T \\ -n_C^T \end{bmatrix} A_{down} b \le \begin{bmatrix} 0 \\ 0 \\ 0 \end{bmatrix} \quad \text{Equation (4-13)}$$

Where $A_{down}$ is the last two rows of the matrix A, m is a product of the number of contact points between the virtual active wheel and the bearing surface and the dimension of the world coordinate system (for example, when one contact point between the robot and the bearing surface, m=2; and when two contact points between the robot and the bearing surface, m=4), μ is a friction factor, $n_c$ is the unit outer normal vector of the contact point between the robot and the bearing surface, $o_c$ is the unit tangent vector of the contact point, q is the generalized coordinates of the robot, $\dot{q}$ is the generalized velocity corresponding to the generalized coordinates, and $\ddot{q}$ is the generalized acceleration corresponding to the generalized coordinates.

Further, at any time t in the takeoff phase, the friction constraint equation may be expressed as follows:

$$\begin{bmatrix} (-\mu(t)n_C(t) + o_C(t))^T \\ (-\mu(t)n_C(t) - o_C(t))^T \\ -n_C(t)^T \end{bmatrix} A(t)_{down} b(t) \le \begin{bmatrix} 0 \\ 0 \\ 0 \end{bmatrix} \quad \text{Equation (4-14)}$$

A derivation process of the anti-collision constraint equation may be as follows:

When the variable-leg-length wheeled inverted pendulum model does not include the virtual tail connected to the virtual base portion or the virtual tail is fixed, in the takeoff phase, the virtual base portion, the virtual leg and the virtual active wheel of the robot cannot get embedded inside the ground, so the anti-collision constraint equation may be obtained as follows:

$$z+\alpha l \cos(\theta) \geq h_m(x+l \sin(\theta)),$$

$$z+r \cos(\beta) \geq h_m(x+r \sin(\beta)) \quad \text{Equation (4-15)}$$

Where $\alpha \in [0,1]$, $\beta \in [0,2\pi]$, z represents the coordinate of the virtual active wheel of the robot in the z-axis direction of the world coordinate system, x represents the coordinate of the virtual active wheel in the x-axis direction of the world coordinate system, l is the length of the virtual leg, $\theta$ is the pitch angle of the virtual base portion in the world coordinate system, r is the radius of the virtual active wheel, $h_m$ represents a height function of any point in the world coordinate system, $\alpha$ and $\beta$ represent range parameters.

Further, at any time t in the takeoff phase, the anti-collision constraint equation may be expressed as follows:

$$z(t)+\alpha l(t) \cos(\theta(t)) \geq h_m(x(t)+l(t) \sin(\theta(t))), \alpha \in [0,1] z$$
$$(t)+r \cos(\beta) \geq h_m(x(t)+r \sin(\beta)), \beta \in [0,2\pi] \quad \text{Equation (4-16)}$$

When the variable-leg-length wheeled inverted pendulum model includes the virtual tail and the virtual tail moves, in the takeoff phase, the virtual base portion, the virtual leg, the virtual active wheel and the virtual tail of the robot cannot get embedded inside the ground, so the anti-collision constraint equation may be obtained as follows:

$$z(t)+\alpha l(t) \cos(\theta(t)) \geq h_m(x(t)+l(t) \sin(\theta(t))), \alpha \in [0,1] z+r$$
$$\cos(\beta) \geq h_m(x+r \sin(\beta)), \beta \in [0,2\pi] p_{t,z} + \alpha(p_{t,e,z} - p_{t,z})$$
$$\geq h_m(p_{t,x} + \alpha(p_{t,e,x} - p_{t,x})), \alpha \in [0,1] \quad \text{Equation (4-17)}$$

Where z represents the coordinate of the virtual active wheel in the z-axis direction of the world coordinate system, x represents the coordinate of the virtual active wheel in the x-axis direction of the world coordinate system, l represents the length of the virtual leg of the robot, $\theta(t)$ represents the pitch angle of the virtual base portion at time t in the world coordinate system, r represents the radius of the virtual active wheel, $h_m$ represents a height function of any point in the world coordinate system, $\alpha$ and $\beta$ represent range parameters, $p_{t,z}$ represents the coordinate of the drive joint of the virtual tail (namely the joint connected to the virtual tail and the virtual base portion) in the z-axis direction of the world coordinate system, $p_{t,x}$ represents the coordinate of the drive joint of the virtual tail in the x-axis direction of the world coordinate system, $p_{t,e,z}$ represents the coordinate of the end of the virtual tail in the z-axis direction of the world coordinate system, and $p_{t,e,x}$ represents the coordinate of the end of the virtual tail in the x-axis direction of the world coordinate system.

When the state quantity constraint limits the state quantity of the target time, the state quantity of the robot at the time may be constrained based on the state quantity constraint at the time.

The boundary constraint equation may be expressed as follows:

$$x_{min} \leq x(t) \leq x_{max}$$

$$u_{min} \leq u(t) \leq u_{max} \quad \text{Equation (4-18)}$$

Where $x_{max}$ and $x_{min}$ respectively represent an upper limit value and a lower limit value of the state quantity corresponding to the somersault motion, $u_{max}$ and $u_{min}$ respectively represent an upper limit value and a lower limit value of the control quantity corresponding to the somersault motion, and x(t) represents the state quantity constraint at time t.

In some embodiments, it is assumed that the state quantity constraint limits that an initial state quantity corresponding to the somersault motion is $x_{1,s}$, then at a start time of the takeoff phase, the state quantity of the robot meets the constraint: $x(t)=x_{1,s}$, $t=t_{1,s}$, where $t_{1,s}$ represents the start time of the takeoff phase.

The continuity constraint equation between the takeoff phase and the flight phase may be expressed as follows:

$$x_{1,e} = x_{2,s} \quad \text{Equation (4-19)}$$

Where $x_{1,e}$ and $x_{2,s}$ respectively represent the state quantity at an end time of the takeoff phase and the state quantity at a start time of the flight phase.

According to the foregoing equations, it can be solved that, corresponding to some embodiments, at the start of the takeoff phase, the torque direction of the virtual active wheel corresponds to the opposite direction of the takeoff direction, so that the central axis of the robot is inclined to the horizontal direction corresponding to the takeoff direction (that is, $\theta$ as shown in FIG. 4 is increased), thereby making preparation for subsequent acceleration in the direction. As time goes on, the torque direction of the virtual active wheel corresponds to the takeoff direction, and the length l of the virtual leg is gradually increased, so as to produce a greater acceleration in the takeoff direction. When there is the virtual tail, $q_t$ increases, corresponding to that the additional component rotates in the rotational direction corresponding to the takeoff direction. In addition, when the additional component includes the additional link connected by the active wheel, the included angle between the first link and the second link is gradually increased during the rotation of the additional component.

When the motion instruction is designed according to the plane-with-floating-base whole-body dynamic model as shown in FIG. 5, the dynamic model corresponding to the plane-with-floating-base whole-body dynamic model in the takeoff phase may be constructed in the following manner.

Based on the generalized coordinates and the generalized velocity, a total kinetic energy E and a total potential energy V corresponding to the robot are calculated, and the Lagrangian of the system may be expressed as L=E-V. In the takeoff phase, the robot includes an internal force and an external force (such as the bearing surface reaction force). According to the Lagrangian Equation, the dynamic model corresponding to the takeoff phase may be obtained as follows:

$$D(q)\ddot{q}+C(q,\dot{q})\dot{q}+G(q)=S^T u+J_c^T f_c+J_L^T f_L \quad \text{Equation (5-5)}$$

Where q represents the generalized coordinates, $\dot{q}$ represents the generalized velocity corresponding to the generalized coordinates, $\ddot{q}$ represents a generalized acceleration corresponding to the generalized coordinates, u represents the control quantity of the robot, D represents an inertia matrix, C represents a centrifugal force and a Coriolis force vector, G represents a gravity vector, S represents a transformation matrix, $J_c$ represents a Jacobian matrix of a contact point between a wheel (the active wheel) and the ground (the bearing surface), and $J_L$ represents a difference between Jacobi matrices of end points of the virtual front calf and the virtual back calf.

In the takeoff phase, it is assumed that there is pure rolling between the virtual active wheel and the bearing surface, an acceleration of the contact point between the virtual active wheel and the bearing surface in the world coordinate system is as follows:

$$J_c \ddot{q} + \dot{J}_c \dot{q} = 0 \quad \text{Equation (5-6)}$$

Since the virtual front calf and the virtual back calf are fixedly connected to the virtual active wheel with no separation, an acceleration difference of a virtual closed point (a connection point of the virtual front calf and the virtual back calf) is 0, namely, $$J_L\ddot{q}+\dot{J}_L\dot{q}=0 \quad \text{Equation (5-7)}$$

With combination of Equation (5-5), the following may be obtained:

$$\begin{bmatrix} D(q) & -J_L^T & -J_C^T \\ J_L & 0 & 0 \\ J_C & 0 & 0 \end{bmatrix} \begin{bmatrix} \ddot{q} \\ f_L \\ f_C \end{bmatrix} = \begin{bmatrix} S^T u - C(q,\dot{q})\dot{q} - G(q) \\ -\dot{J}_L\dot{q} \\ -\dot{J}_C\dot{q} \end{bmatrix} \quad \text{Equation (5-8)}$$

Since $D(q)$ is a square matrix and full rank, $J_c$, $J_L$ are full row rank, it can be determined that the first item on the left in Equation (5-8) is full rank. Then, the generalized acceleration, the closed-chain contact force and the bearing surface reaction force may be expressed as follows:

$$\begin{bmatrix} \ddot{q} \\ f_L \\ f_C \end{bmatrix} = \quad \text{Equation (5-9)}$$

$$\begin{bmatrix} D(q) & -J_L^T & -J_C^T \\ J_L & 0 & 0 \\ J_C & 0 & 0 \end{bmatrix}^{-1} \begin{bmatrix} S^T u - C(q,\dot{q})\dot{q} - G(q) \\ -\dot{J}_L\dot{q} \\ -\dot{J}_C\dot{q} \end{bmatrix} = A_1 b_1$$

The state quantity of the robot is taken as $x=[q^T \dot{q}^T]^T$, and the dynamic constraint equation in the takeoff phase may be expressed as follows:

$$\dot{x} = \begin{bmatrix} \dot{q} \\ \ddot{q} \end{bmatrix} = \begin{bmatrix} \dot{q} \\ A_{1,up}b_1 \end{bmatrix} \quad \text{Equation (5-10)}$$

Where $A_{1,up}$ represents the first n rows of the matrix $A_1$ on the right of Equation (5-9), n is the number of parameters in the generalized coordinates of the robot, $\dot{x}$ is a derivative of the state quantity of the robot, q is the generalized coordinates, $\dot{q}$ is the generalized velocity corresponding to the generalized coordinates, and $\ddot{q}$ is the generalized acceleration corresponding to the generalized coordinates.

Further, at any time t in the takeoff phase, the dynamic constraint equation may be expressed as follows:

$$\dot{x}(t) = \begin{bmatrix} \dot{q}(t) \\ \ddot{q}(t) \end{bmatrix} = \begin{bmatrix} \dot{q}(t) \\ A(t)_{q,up}b(t)_1 \end{bmatrix} \quad \text{Equation (5-11)}$$

A derivation process of the friction constraint equation may be as follows.

Based on the assumption of pure rolling, the bearing surface reaction force meets the friction cone constraint. By linearizing the bearing surface reaction force, the friction constraint equation is obtained, which may be expressed as follows:

$$\begin{bmatrix} (-\mu n_C + o_C)^T \\ (-\mu n_C - o_C)^T \\ -n_C^T \end{bmatrix} A_{1,down}b_1 \leq \begin{bmatrix} 0 \\ 0 \\ 0 \end{bmatrix} \quad \text{Equation (5-12)}$$

Where $A_{1,down}$ is the last two rows of the matrix $A_1$ on the right of Equation (5-9), $\mu$ is the friction factor, $n_c$ is the unit outer normal vector of the contact point between the robot and the bearing surface, and $o_c$ is the unit tangent vector of the contact point.

A derivation process of the anti-collision constraint equation may be as follows.

In When the plane-with-floating-base whole-body dynamic model does not include the virtual tail connected to the virtual base portion or the virtual tail is fixed, in the takeoff phase, the virtual base portion, the virtual leg and the virtual active wheel of the robot cannot get embedded inside the ground, so the anti-collision constraint equation may be obtained as follows:

$$p_{j,z}+\alpha(p_{k,z}-p_{j,z})\geq h_m(p_{k,x}+\alpha(p_{j,x}-p_{k,x})), \quad \text{Equation (5-13)}$$

$$z+r\cos(\beta)\leq h_m(x+r\sin(\beta)), \quad \text{Equation (5-14)}$$

Where $\alpha \in [0,1]$, j, k $\in [1,6]$, k,j are the numbers of two adjacent joints, $(p_{j,x}, p_{j,z})$ $(p_{k,x}, p_{k,z})$ are the coordinates of the two adjacent joints in the world coordinate system, $p_{j,z}$ is the coordinate of the joint j in the world coordinate system, $p_{j,x}$ is the coordinate of the joint j on the x-axis of the world coordinate system, $p_{k,z}$ is the coordinate of the joint k on the z-axis of the world coordinate system, $p_{k,x}$ is the coordinate of the joint k on the x-axis of the world coordinate system x-axis, r is the radius of the virtual active wheel, $h_m$ is the height function of any point in the world coordinate system, $\alpha$ and $\beta$ are range parameters.

Further, at any time t in the takeoff phase, the anti-collision constraint equation may be expressed as follows:

$$p(t)_{j,z}+\alpha(p(t)_{k,z}-p(t)_{j,z})\geq h_m(p(t)_{k,x}+\alpha(p(t)_{j,x}-p(t)_{k,x})),$$
$$z(t)+r\cos(\beta)\geq h_m(z(t)+r\sin(\beta)), \quad \text{Equation (5-15)}$$

Where $\beta \in [0,2\pi]$, $\alpha \in [0,1]$, j,k $\in [1,6]$. When the plane-with-floating-base whole-body dynamic model includes the virtual tail and the virtual tail moves, the anti-collision between the tail and the ground may be considered. With reference to Equation (5-15), the anti-collision constraint equation can be similarly solved.

The larger one of the lower limit value of the state quantity and the lower limit value corresponding to the state quantity constraint may be taken as the lower limit value of the state quantity during the somersault motion, and the smaller one of the upper limit value of the state quantity and the upper limit value corresponding to the state quantity constraint may be taken as the upper limit value of the state quantity during the somersault motion. When the state quantity constraint limits the state quantity of the target time, the state quantity of the robot at this time may be constrained based on the state quantity constraint at this time.

The boundary constraint equation at the start time of the takeoff phase may be expressed as follows:

$$x(t)=x_{1,s}, t=t_{1,s} \quad \text{Equation (5-16)}$$

Where $t_{1,s}$ is the start time of the takeoff phase. The state quantity and the control quantity of the robot in the takeoff phase are further described by:

$$x_{min}\leq x(t)\leq x_{max}$$

$$u_{min}\leq u(t)\leq u_{max} \quad \text{Equation (5-17)}$$

Where $x_{max}$ and $x_{min}$ respectively represent the upper limit value and the lower limit value of the state quantity corresponding to the somersault motion, $u_{max}$ and $u_{min}$ respectively represent the upper limit value and the lower limit value of the control quantity corresponding to the somersault motion, and x(t) represents the state quantity at the time t.

The continuity constraint equation between the takeoff phase and the flight phase may be expressed as follows:

$$x(t_{1,e})=x(t_{2,s})$$ Equation (5-18)

Where $t_{1,e}$ and $t_{2,s}$ respectively represent an end time of the takeoff phase and a start time of the flight phase.

According to the foregoing equations, it can be solved that, corresponding to some embodiments, at the start of the takeoff phase, the torque direction of the virtual active wheel corresponds to the opposite direction of the takeoff direction, so that the central axis of the robot is inclined to the horizontal direction corresponding to the takeoff direction (that is, θ as shown in FIG. 5 is increased), thereby making preparation for subsequent acceleration in the direction. As time goes on, the torque direction of the virtual active wheel corresponds to the takeoff direction, and the included angle between the virtual thigh and the virtual calf is increased (similar to the process of stretching legs), so as to produce a greater acceleration in the takeoff direction. When there is the virtual tail, the additional component rotates in the rotational direction corresponding to the takeoff direction. In addition, when the additional component includes the additional link, the included angle between the central axis of the additional link and a perpendicular bisector of the base portion is gradually increased during the rotation of the additional component.

Figure 7:
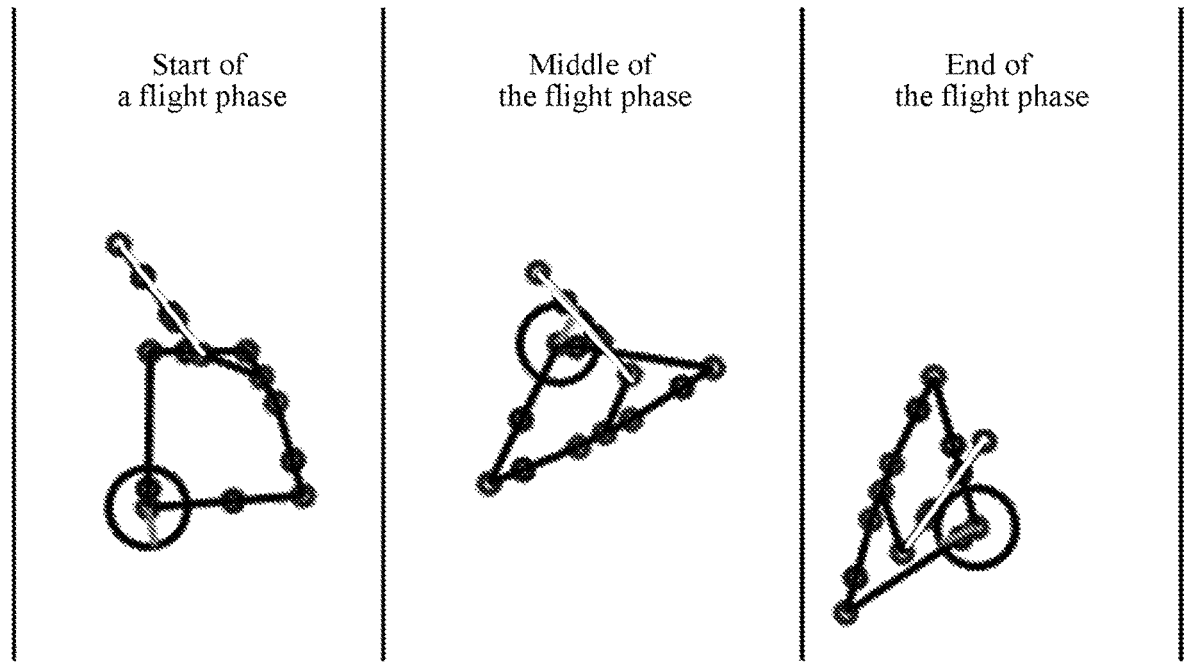
FIG. 7 shows a schematic diagram of an example robot in a flight phase according to some embodiments.

Referring to FIG. 7, the motion state of the robot during the flight and how to realize the motion control during the flight by controlling the joints are described.

As shown in FIG. 7, in the flight phase of the somersault motion, the joints in the wheel-leg portion that are connected to the base portion may be controlled by the motion instruction, so as to allow the robot to rotate in the rotational direction corresponding to the takeoff direction, and there is a time at which the center of mass of the wheel-leg portion is higher than the center of mass of the base portion during the rotation.

For example, in some embodiments, at a start of the flight phase, the motion instruction may instruct to control the joints in the wheel-leg portion that are connected to the base portion, so as to shorten a distance between the center of mass of the wheel-leg portion and the center of mass of the base portion. The robot may change from the pose of extending legs to the pose of retracting legs. Under the condition of conservation of angular momentum, the rotational inertia is reduced and the rotational angular velocity is increased, which facilitates control of the somersault motion, and realize a higher height in the somersault motion.

As shown in FIG. 7, at the start of the flight phase, there may be a time at which the connecting line between the center of the active wheel in the wheel-leg portion and the center of the base portion is intersected with the perpendicular bisector of the base portion. The torque at the joint where the front leg is connected to the base portion may be controlled to be greater than the torque at the joint where the back leg is connected to the base portion, so that the front leg can drive the back leg to complete the somersault motion.

For example, in some embodiments, at a middle of the flight phase, the motion instruction may instruct to control the joints in the wheel-leg portion that are connected to the base portion, so as to maintain the distance between the center of mass of the wheel-leg portion and the center of mass of the base portion at a relatively short distance, thereby allowing the robot to perform the somersault motion at a relatively great angular velocity.

For example, in some embodiments, at an end of the flight phase, the motion instruction controls the joints in the wheel-leg portion that are connected to the base portion, to increase the distance between the center of mass of the wheel-leg portion and the center of mass of the base portion, thereby realizing the effect of extending legs. The pose of extending legs is conducive to landing buffer.

For example, in some embodiments, when there is the additional component, during rotation of the additional component, an included angle between the central axis of the additional link and the perpendicular bisector of the base portion is gradually increased and then gradually decreased. At the start of the flight phase, the robot throws out the additional component, so as to provide a greater kinetic energy with the additional component. Then, after the flight phase, the additional component is retracted, to reduce the rotational inertia and increase the rotation angular velocity, which facilitates the completion of the somersault motion.

In order to design the motion instruction that can realize the foregoing control mode, the corresponding dynamic model and the set of constraint equations may be further designed according to the variable-leg-length wheeled inverted pendulum model and the plane-with-floating-base whole-body dynamic model.

When the motion instruction is designed according to the variable-leg-length wheeled inverted pendulum model as shown in FIG. 4, the dynamic model corresponding to the variable-leg-length wheeled inverted pendulum model in the takeoff phase may be constructed in the following manner.

Similarly, based on the generalized coordinates and the generalized velocity, the total kinetic energy E and the total potential energy V corresponding to the robot are calculated, and the Lagrangian of the system may be expressed as L=E-V. In the flight phase, the robot includes no external force (such as the bearing surface reaction force), and according to the Lagrangian Equation, the dynamic equation corresponding to the flight phase may be obtained:

$$D(q)\ddot{q}+C(q,\dot{q})\dot{q}+G(q)=S^T u$$ Equation (4-21)

Therefore, the dynamic constraint equation corresponding to the flight phase is expressed as follows:

$$\dot{x}=\begin{bmatrix}\dot{q}\\\ddot{q}\end{bmatrix}=\begin{bmatrix}\dot{q}\\D^{-1}(q)(S^T u - C(q,\dot{q})\dot{q}-G(q))\end{bmatrix}=f(q,\dot{q},u)$$ Equation (4-22)

Where $\dot{x}$ represents a derivative of the state quantity of the robot, q represents the generalized coordinates of the robot, $\dot{q}$ represents the generalized velocity corresponding to the generalized coordinates, $\ddot{q}$ represents the generalized acceleration corresponding to the generalized coordinates, u represents the control quantity of the robot, D is the inertia matrix, C is the centrifugal force and Coriolis force vector, G is the gravity vector, and S represents the selection matrix.

Further, at any time t in the flight phase, the dynamic constraint equation may be expressed as follows:

$$(t)=f(t,q,\dot{q},u)$$ Equation (4-23)

In the flight phase, since the robot is out of contact with the bearing surface, the flight phase does not involve the friction constraint equation. The anti-collision constraint equation in the flight phase is the same as that in the takeoff phase.

A derivation process of the continuity constraint equation between the flight phase and the landing phase may be as follows.

In the landing phase, it is assumed that there is an inelastic collision between the robot and the bearing surface, that is, the collision is completed in an instant. According to the law of conservation of momentum, the state quantity after the collision and the state quantity before the collision may satisfy the following relationship:

$$D(q_{3,s})\dot{q}_{3,s} - D(q_{2,e})\dot{q}_{2,e} = J_c(q_{3,s})^T f_c \qquad \text{Equation (4-24)}$$

Where $\dot{q}_{2,e}$ represents the generalized velocity at an end time of the flight phase, $q_{2,e}$ represents the generalized coordinates at the end time of the flight phase, $q_{3,s}$ represents the generalized coordinates at a start time of the landing phase, 43,s represents the generalized velocity at the start time of the landing phase, and $q_{2,e}=q_{3,s},\dot{q}_{2,e}\neq\dot{q}_{3,s}$.

At the start time of the landing phase, a velocity of the contact point between the active wheel and the receiving surface is 0, then:

$$J_c(q_{3,s})\dot{q}_{3,s}=0 \qquad \text{Equation (4-25)}$$

From the above, the following may be obtained:

$$\begin{bmatrix} D(q_{2,e}) & -J_C(q_{2,e})^T \\ J_C(q_{2,e}) & 0 \end{bmatrix} \begin{bmatrix} \dot{q}_{3,s} \\ f_C \end{bmatrix} = \begin{bmatrix} D(q_{2,e})\dot{q}_{2,e} \\ 0 \end{bmatrix} \qquad \text{Equation (4-26)}$$

Since $D(q_{2,e})$ is a square matrix and full rank, and $J_c(q_{2,e})$ is full row rank, it can be determined that the first item on the left side of Equation (4-26) is full rank. Then, at the start time of the landing phase, the generalized velocity and the bearing surface reaction force may be expressed as follows:

$$\begin{bmatrix} \dot{q}_{3,s} \\ f_C \end{bmatrix} = \begin{bmatrix} D(q_{2,e}) & -J_C(q_{2,e})^T \\ J_C(q_{2,e}) & 0 \end{bmatrix}^{-1} \begin{bmatrix} D(q_{2,e})\dot{q}_{2,e} \\ 0 \end{bmatrix} = Qp \qquad \text{Equation (4-27)}$$

The continuity constraint equation between the flight phase and the landing phase may be expressed as follows:

$$\begin{bmatrix} q_{3,s} \\ \dot{q}_{3,s} \end{bmatrix} = \begin{bmatrix} q_{2,e} \\ Q_{up}p_{up} \end{bmatrix} \qquad \text{Equation (4-28)}$$

Where matrix matrix $$Q = \begin{bmatrix} D(q_{2,e}) & -J_C(q_{2,e})^T \\ J_C(q_{2,e}) & 0 \end{bmatrix}^{-1},$$

matrix $$p = \begin{bmatrix} D(q_{2,e})\dot{q}_{2,e} \\ 0 \end{bmatrix},$$

$Q_{up}p$ represents a product of the first n rows of the matrix Q and the matrix p, n is the number of parameters in the generalized coordinates of the robot, $q_{3,s}$ represents the generalized coordinates of the robot at the start time of the landing phase, $\dot{q}_{3,s}$ represents the generalized velocity of the robot at the start time of the landing phase, $q_{2,e}$ represents the generalized coordinates of the robot at the end time of the flight phase, $\dot{q}_{2,e}$ represents the generalized velocity of the robot at the end time of the flight phase, D is the inertia matrix, and $J_c$ represents the Jacobian matrix of the contact point between the virtual active wheel and the bearing surface.

According to the foregoing equations, it can be solved that, corresponding to some embodiments, at the start of the flight phase, the length of the virtual leg is decreased (similar to the process of retracting legs), so as to produce a greater acceleration in the takeoff direction. When there is the virtual tail, the additional component rotates in the rotational direction corresponding to the takeoff direction. In addition, during the rotation of the additional component, the included angle between the central axis of the additional link and the perpendicular bisector of the base portion is gradually decreased, so as to realize the process of retracting the virtual tail. At the end of the flight phase, the length of the virtual leg is increased, to achieve the effect of extending legs. The pose of the extending legs is conducive to landing buffer.

When the motion instruction is designed according to the plane-with-floating-base whole-body dynamic model as shown in FIG. 5, the dynamic model corresponding to the plane-with-floating-base whole-body dynamic model during the flight takeoff phase may be constructed in the following manner.

Similarly, based on the generalized coordinates and the generalized velocity, the total kinetic energy E and the total potential energy V corresponding to the robot are calculated, and the Lagrangian of the system may be expressed as L=E-V. In the flight phase, since the robot includes no external force (such as the bearing surface reaction force), but a closed-loop constraint is desired, the dynamic equation corresponding to the flight phase may be obtained according to the Lagrangian equation:

$$\begin{bmatrix} D(q) & -J_L^T \\ J_L & 0 \end{bmatrix} \begin{bmatrix} \ddot{q} \\ f_L \end{bmatrix} = \begin{bmatrix} S^T u - C(q,\dot{q})\dot{q} - G(q) \\ -\dot{J}_L\dot{q} \end{bmatrix} \qquad \text{Equation (5-19)}$$

Since D(q) is a square matrix and full rank, $J_L$ is full row rank, it can be determined that the first term on the left side of Equation (5-19) is full rank. Then, the acceleration and the closed-loop contact force in the generalized coordinates may be obtained as follows:

$$\begin{bmatrix} \ddot{q} \\ f_L \end{bmatrix} = \begin{bmatrix} D(q) & -J_L^T \\ J_L & 0 \end{bmatrix}^{-1} \begin{bmatrix} S^T u - C(q,\dot{q})\dot{q} - G(q) \\ -\dot{J}_L\dot{q} \end{bmatrix} = A_2 b_2 \qquad \text{Equation (5-20)}$$

The state quantity is taken as $x=[q^T\ \dot{q}^T]^T$, so the dynamic constraint in the flight phase may be expressed as follows:

$$\dot{x} = \begin{bmatrix} \dot{q} \\ \ddot{q} \end{bmatrix} = \begin{bmatrix} \dot{q} \\ A_{2,up} b_2 \end{bmatrix} \qquad \text{Equation (5-21)}$$

Where $A_{2,up}$ is the first n rows of the matrix $A_2$ on the right of Equation (5-20), and n is the number of generalized coordinates. Therefore, at any time t during the flight, the dynamic constraint is as follows:

$$\dot{x}(t) = \begin{bmatrix} \dot{q}(t) \\ \ddot{q}(t) \end{bmatrix} = \begin{bmatrix} \dot{q}(t) \\ A(t)_{2,up} b(t)_2 \end{bmatrix} \qquad \text{Equation (5-22)}$$

In the flight phase, since the robot is out of contact with the bearing surface, the flight phase does not involve the friction constraint equation. The anti-collision constraint equation in the flight phase is the same as that in the takeoff phase. A derivation process of the continuity constraint equation between the flight phase and the landing phase may be as follows.

In the landing phase, it is assumed that there is an inelastic collision between the robot and the bearing surface, that is, the collision is completed in an instant. According to the law of conservation of momentum, the state quantity after the collision and the state quantity before the collision may satisfy the following relationship:

$$D(q_{3,s})\dot{q}_{3,s} - D(q_{2,e})\dot{q}_{2,e} = J_c(q_{3,s})^T c + J_L(q_{3,s})^T f_L \qquad \text{Equation (5-23)}$$

Where $\dot{q}_{2,e}$ represents the generalized velocity at the end time of the flight phase, $q_{2,e}$ represents the generalized coordinates at the end time of the flight phase, $q_{3,s}$ represents the generalized coordinates at the start time of the landing phase, $\dot{q}_{3,s}$ represents the generalized velocity at the start time of the landing phase, and $q_{2,e} = q_{3,s}$, $\dot{q}_{2,e} \neq \dot{q}_{3,s}$.

In addition, the start time of the landing phase meets the closed-loop constraint, and the velocity of the contact point between the wheels and the ground is 0, so $$J_L(q_{3,s})\dot{q}_{3,s} 0 \text{ and } J_c(q_{3,s})\dot{q}_{3,2} = 0.$$

From the above, the following may be obtained:

$$\begin{bmatrix} D(q_{2,e}) & -J_L(q_{2,e})^T & -J_C(q_{2,e})^T \\ J_L(q_{2,e}) & 0 & 0 \\ J_C(q_{2,e}) & 0 & 0 \end{bmatrix} \begin{bmatrix} \dot{q}_{3,s} \\ f_L \\ f_C \end{bmatrix} = \begin{bmatrix} D(q_{2,e})\dot{q}_{2,e} \\ 0 \\ 0 \end{bmatrix} \qquad \text{Equation (5-24)}$$

Therefore, the generalized velocity at the start time of the landing phase obtained according to the inelastic collision is:

$$\begin{bmatrix} \dot{q}_{3,s} \\ f_L \\ f_C \end{bmatrix} = \begin{bmatrix} D(q_{2,e}) & -J_L(q_{2,e})^T & -J_C(q_{2,e})^T \\ J_L(q_{2,e}) & 0 & 0 \\ J_C(q_{2,e}) & 0 & 0 \end{bmatrix}^{-1} \begin{bmatrix} D(q_{2,e})\dot{q}_{2,e} \\ 0 \\ 0 \end{bmatrix} = Qp \qquad \text{Equation (5-25)}$$

The continuity constraint between the flight phase and the landing phase is:

$$\begin{bmatrix} q_{3,s} \\ \dot{q}_{3,s} \end{bmatrix} = \begin{bmatrix} q_{2,e} \\ Q_{up}p \end{bmatrix} \qquad \text{Equation (5-26)}$$

Where $Q_{up}$ is the first n rows of the matrix Q on the right side of Equation (5-25), and n is the number of the generalized coordinates.

According to the foregoing equations, it can be solved that, corresponding to some embodiments, at the start of the flight phase, the included angle between the virtual thigh and the virtual calf is reduced (similar to the process of retracing legs), so that the rotational inertia of the robot is reduced, thereby producing a greater rotation velocity. When there is the virtual tail, the additional component rotates in the rotational direction corresponding to the takeoff direction. In addition, when the additional component includes the first link and the second link connected by the passive wheel, the included angle between the first link and the second link is gradually decreased during the rotation of the additional component, which realizes the process of retracting the virtual tail. At the end of the flight phase, the included angle between the virtual thigh and the virtual calf is increased (similar to the process of extending legs), which achieves the effect of extending legs. The pose of extending legs is conducive to landing buffer.

Figure 8:
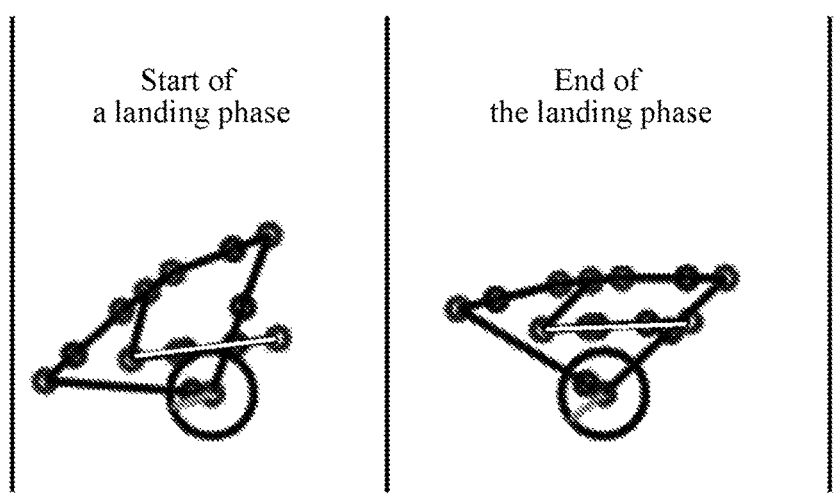
FIG. 8 shows a schematic diagram of an example robot in a landing phase according to some embodiments.

Referring to FIG. 8, the motion state of the robot during the landing and how to realize the motion control during the landing by controlling the joints are described.

As shown in FIG. 8, in the landing phase of the somersault motion, the joints in the wheel-leg portion that are connected to the base portion may be controlled by the motion instruction, so as to control the joints in the wheel-leg portion that are connected to the base portion and the active wheels in the wheel-leg portion, thereby allowing the robot into a balanced and upright state.

For example, in some embodiments, at a start of the landing phase, the motion instruction may instruct to control the joints in the wheel-leg portion that are connected to the base portion, so as to shorten a distance between the center of mass of the wheel-leg portion and the center of mass of the base portion. The robot may change from the pose of extending legs to the pose of retracting legs, thereby reducing the impact of landing.

For example, in some embodiments, at an end of the landing phase, the motion instruction controls the joints in the wheel-leg portion that are connected with the base portion and the active wheel, to allow the connecting line between the center of the active wheel in the wheel-leg portion and the center of the base portion to be coincided with the perpendicular bisector of the base portion, thereby realizing the balanced and upright state.

In order to design the motion instruction that can realize the foregoing control mode, the corresponding dynamic model and the set of constraint equations may be further designed according to the variable-leg-length wheeled inverted pendulum model and the plane-with-floating-base whole-body dynamic model. The dynamic model and the constrains in the landing phase are similar to those in the takeoff phase.

The following describes a process of setting the joint control constraint of the robot. The process of joint control constraint is described with reference to the example model as shown in FIG. 5.

In the process of setting the joint control constraint function of the robot, first, the dynamic model of the robot is established, and a constraint relationship between an acceleration for each sub-task control (such as the dynamic constraint, the friction constraint, the collision constraint, and the like in the different phases) and an actual input joint torque is established.

In addition, under the assumption of pure rolling friction between the wheels and the ground and no sliding friction, there is a constraint that the accelerations of the contact point in the x-direction (forward direction) and the z-direction (vertical direction) of the local coordinate system are 0. By calculating a Jacobi matrix $J_c$ of the velocities $v_1$ of the left wheel-leg portion and the right wheel-leg portion in the x-direction and the z-direction of the local coordinate system relative to the generalized joint motion velocity $\dot{q}$, according to the acceleration constraint, the following may be obtained:

$$\alpha_1 = \dot{v}_1 J_c \dot{q} + J_c \ddot{q} = 0 \qquad \text{Equation (9-1)}$$

Where $\alpha_1$ is the acceleration of the wheel-leg portion, $v_1 = [v_{x,l}, v_{z,l}, v_{x,r}, v_{z,r}]$, $v_{x,l}$ is the velocity of the left wheel-leg portion in the x-direction, $v_{z,l}$ is the velocity of the left wheel-leg portion in the z-direction, $v_{x,r}$ is the velocity of the right wheel-leg portion in the x-direction, $v_{z,r}$ is the velocity of the right wheel-leg portion in the z-direction, q is a joint position of each joint of the robot, $\dot{q}$ is a joint velocity of each joint of the robot, $\ddot{q}$ is a joint acceleration of each joint of the robot, and $J_c$ is the Jacobi matrix of the velocities $v_1$ of the left wheel-leg portion and the right wheel-leg portion in the x-direction and z-direction of the local coordinate system relative to the generalized joint motion velocity $\dot{q}$.

In addition, an acceleration bias of the contact point of the generalized joint acceleration $\ddot{q}=0$ may be obtained as follows:

$$J_c\dot{q}=f_\alpha(q, \dot{q}, 0, \text{Contact}) \qquad \text{Equation (9-2)}$$

Where $f_\alpha$ represents an acceleration function, Contact represents a parameter quantity related to the contact process, and the definitions of the remaining parameters are as described above.

Using a similar approach, a closed-chain constraint equation of the parallel leg portions in a generalized open-chain coordinate system is:

$$\alpha_2=\dot{v}_2=J_\lambda\ddot{q}+\dot{J}_\lambda\dot{q}=0 \qquad \text{Equation (9-3)}$$

Where $\alpha_2$ is the acceleration of the parallel leg portions, $v_2$ is the velocity of the parallel leg portions, $J_\lambda$ is a Jacobi matrix of the velocity $v_2$ of the parallel leg portions in the generalized open-chain coordinate system relative to the generalized joint motion velocity $\dot{q}$, $\dot{q}$ is the joint velocity of each joint of the robot, and $\ddot{q}$ is the joint acceleration of each joint of the robot.

The acceleration bias may be calculated using the following equation, where Close represents a parameter quantity associated with the closed-chain constraint of the parallel leg portions, and the definitions of the remaining parameters are as described above:

$$J_\lambda\dot{q}=f_{60}(q, \dot{q}, 0, \text{Close}) \qquad \text{Equation (9-4)}$$

From the above, the dynamic equation and the contact constraint equations of no external interference are obtained:

$$M\ddot{q}+C+G=S^T\tau+J_c^T F_c+J_\lambda^T F_\lambda \qquad \text{Equation (9-5)}$$

$$S=0 \qquad \text{Equation (9-6)}$$

$$J_c\ddot{q}+\dot{J}_c\dot{q}=0 \qquad \text{Equation (9-7)}$$

$$J_\lambda\ddot{q}+\dot{J}_\lambda\dot{q}=0 \qquad \text{Equation (9-8)}$$

Where $M,C,G,S,J_c,J_{80},\dot{J}_c\dot{q},\dot{J}_\lambda\dot{q}$ are known quantities. The mass matrix M can be quickly calculated based on the joint position q and using the composite rigid body algorithm (CRBA); the centrifugal force and Coriolis force offset C can be quickly calculated based on the joint position q and the joint velocity $\dot{q}$ and using the recursive Newton-Euler algorithm (RNEA); and the gravity offset G can be calculated based on the joint position q and using the RNEA. The selection matrix S is configured to distinguish active joints and undriven joints, which is expressed as $S=\text{diag}(\alpha_1, \alpha_2, \ldots, \alpha_n)$, where $a_i=1$ represents an undriven joint.

In addition, $\ddot{q}$, $\tau$, $F_c$, $F_\lambda$ are variables, where $\ddot{q}$ is the joint acceleration, $\tau$ is a torque item corresponding to the joint, and $F_c$ is a generalized force of the contact point in the local coordinate system. $Fc=[f_{c,x,l}, f_{c,z,l}, f_{c,x,r}, f_{c,z,r}] \in R^4$, where $f_{c,x,l}$ is the generalized force of the left wheel-leg portion of the robot in the x-direction, $f_{c,z,l}$ is generalized force of the left wheel-leg portion of the robot in the z-direction, $f_{c,x,r}$ is the generalized force of the right wheel-leg portion of the robot in the x-direction, and $f_{c,z,r}$ is the generalized force of the right wheel-leg portion of the robot in the z-direction. $F_\lambda$ is a closed-chain force of the front leg portion acting on the back leg portion, $F_\lambda=[f_{\lambda,x,l}, f_{\lambda,z,l}, f_{\lambda,x,r}, f_{\lambda,z,r}] \in R^4$, where $f_{\lambda,x,l}$ is a force that the front leg portion in the two parallel leg portions of the left wheel-leg portion acting on the back leg portion in the x-direction, and $f_{\lambda,z,l}$ is a force that the front leg portion in the two parallel leg portions of the left wheel-leg portion acting on the back leg portion in the z-direction, $f_{\lambda,x,r}$ is a force that the front leg portion in the two parallel leg portions of the right wheel-leg portion acting on the back leg portion in the x-direction, and $f_{\lambda,z,r}$ is a force that the front leg portion in the two parallel leg portions of the right wheel-leg portion acting on the back leg portion in the z-direction.

The foregoing equation constraints may be obtained using the complete dynamics approaches. In addition, according to the friction cone constraint, the contact force $F_c$ in the local system (a tangent direction of the friction surface) may be described by:

$$f_{c,x,l} \in [-\mu f_{c,z,l}, \mu f_{c,z,l}], f_{c,z,l} \geq 0 \qquad \text{Equation (9-9)}$$

$$f_{c,x,r} \in [-\mu f_{c,z,r}, \mu f_{c,x,r}], f_{c,z,r} \geq 0 \qquad \text{Equation (9-10)}$$

Where $f_{c,x,l}$ is the generalized force of the left wheel-leg portion of the robot in the x-direction, $\mu$ is the friction factor in the current surrounding environment, $f_{c,z,l}$ is the generalized force of the left wheel-leg portion of the robot in the z-direction, $f_{c,x,r}$ is the generalized force of the right wheel-leg portion of the robot in the x-direction, $f_{c,z,r}$ is the generalized force of the right wheel-leg portion of the robot in the z-direction.

In addition, the friction cone constraint matrix may be obtained as follows:

$$J_{f,l} = \begin{bmatrix} 1 & \mu \\ -1 & \mu \\ 0 & 1 \end{bmatrix}, J_{f,r} = \begin{bmatrix} 1 & \mu \\ -1 & \mu \\ 0 & 1 \end{bmatrix} \qquad \text{Equation (9-11)}$$

Where $J_{f,l}$ is a friction constraint matrix corresponding to a left wheel contact point of the robot, $J_{f,r}$ is a friction constraint matrix corresponding to a right wheel contact point of the robot, and $\mu$ is the friction factor in the current surrounding environment.

Therefore, a joint equality constraint sub-function, a joint inequality constraint sub-function, and a joint threshold constraint sub-function of the joint control constraint function are obtained.

The joint equality constraint sub-function includes:

$$\begin{bmatrix} M_t & -J_{c,t}^T & -J_{\lambda,t}^T & -I \\ 0 & 0 & 0 & S \\ J_{c,t} & 0 & 0 & 0 \\ J_{\lambda,t} & 0 & 0 & 0 \end{bmatrix} \begin{bmatrix} \ddot{q}_{t+1} \\ F_{c,t+1} \\ F_{\lambda,t+1} \\ \tau_{t+1} \end{bmatrix} = \begin{bmatrix} -C_t - G_t \\ 0 \\ -\dot{J}_{c,t}\dot{q}_t \\ -\dot{J}_{\lambda,t}\dot{q}_t \end{bmatrix} \qquad \text{Equation (9-12)}$$

Where $\ddot{q}_{t+1}$ is the joint acceleration of the robot at the target time, $\dot{q}_t$ is the current joint velocity of the robot, $F_{c,t+1}$ is the generalized force of the contact point of the robot at the target time in the local coordinate system, $F_{\lambda,t+1}$ is an action force between the two parallel leg portions at the target time, $\tau_{t+1}$ is the joint torque of the robot at the target time, $J_{c,t}$ and $J_{\lambda,t}$ are Jacobian matrices that respectively correspond to the generalized force Fc of the contact point of the robot and the action force $F_\lambda$ between the two parallel leg portions at the current time in the local coordinate system; $C_t$, $G_t$, $M_t$ are parameter quantities generated based on current joint motion information of the robot; S is a parameter quantity determined based on the joint configuration of the robot, I is a unit matrix, whose dimension is determined according to the number of degrees of freedom of motion of the robot, t is the current time of the motion of the robot, and t+1 is the target time of the motion of the robot.

The joint inequality constraint sub-function includes:

$$\begin{bmatrix} J_{f,l} & 0 \\ 0 & J_{f,r} \end{bmatrix} F_{c,t+1} \geq 0 \qquad \text{Equation (9-13)}$$

Where $J_{f,l}$ is the friction constraint matrix corresponding to the left wheel contact point of the robot, and $J_{f,r}$ is the friction constraint matrix corresponding to the right wheel contact point of the robot. The friction cone constraint matrix may be expressed as:

$$J_{f,l} = \begin{bmatrix} 1 & \mu \\ -1 & \mu \\ 0 & 1 \end{bmatrix}, J_{f,r} = \begin{bmatrix} 1 & \mu \\ -1 & \mu \\ 0 & 1 \end{bmatrix} \qquad \text{Equation (9-14)}$$

The joint threshold constraint sub-function includes:

$$\tau_{t+1} \in [\tau_{min}, \tau_{max}] \qquad \text{Equation (9-15)}$$

In the foregoing equality and inequality constraints, there is an association between the variables $\ddot{q}_{t+1}$, $F_{c,t+1}$, $F_{\lambda,t+1}$, $\tau_{t+1}$. When the input torque is known, that is, $\tau_{t+1}$ is known, and there is no inequality constraint, the least-squares solution of $\ddot{q}_{t+1}$, $F_{c,t+1}$, $F_{\lambda,t+1}$ can be obtained.

$$\begin{bmatrix} M_t & -J_{c,t}^T & -J_{\lambda,t}^T & -I \\ 0 & 0 & 0 & S \\ J_{c,t} & 0 & 0 & 0 \end{bmatrix} \begin{bmatrix} \ddot{q}_{t+1} \\ F_{c,t+1} \\ F_{\lambda,t+1} \end{bmatrix} = \begin{bmatrix} -C_t - G_t \\ 0 \\ -\dot{J}_{c,t}\dot{q}_t \\ -\dot{J}_{\lambda,t}\dot{q}_t \end{bmatrix} \qquad \text{Equation (9-16)}$$

It can be seen that, although $$\begin{bmatrix} \ddot{q}_{t+1} \\ F_{c,t+1} \\ F_{\lambda,t+1} \end{bmatrix}$$

belongs to a high-dimensional space, there are a one-to-one mapping relationship with the joint torque subspace whose dimension is k (k is much smaller than the dimension of the high-dimensional space). That is, due to the equality and inequality constraints, $$\begin{bmatrix} \ddot{q}_{t+1} \\ F_{c,t+1} \\ F_{\lambda,t+1} \end{bmatrix}$$

actually belongs to a low-dimensional boundary manifold in the high-dimensional space that satisfies the equality constraint. The value of $\tau$ of the corresponding torque subspace can be obtained by appropriately selecting the acceleration of the subspace or the force $F_c\tau$.

In addition, through the Jacobian matrix, the linear mapping relationship between an acceleration in an operating space and an acceleration in a generalized joint space can be defined, so as to obtain the acceleration in the operating space having consistent degree of freedom with the low-dimensional manifold. That is, the corresponding joint torque input that meets the dynamic constraints can be obtained, thereby realizing the control of the operating space in the low-dimensional manifold (new control requirements of the robot do not break the equation and inequality constraints).

In addition, the selection of the operating space ensures that the Jacobian matrix $J_{task}$ of the final total task meets the rank($J_{task}$)≥k (k is the dimension of the joint space). If rank($J_{task}$)<k, it indicates that there is an uncontrolled subspace, which causes the dynamic system to diverge. If rank($J_{task}$)>k, it indicates that there may be a task requirement that breaks the constraints. If rank($J_{task}$)=k, it indicates, for example, that a final criterion can be obtained.

Based on the above, when satisfying the foregoing dynamic and the friction constraint, the corresponding relationship between the operating space (in which the robot motion control is performed) of the robot and the joint motion space (in which each joint of the robot performs corresponding joint motion) of the robot can be determined. Therefore, in the operating space of the robot, the wheel-leg portion target motion state can be converted to the joint motion space of the robot according to the corresponding relationship. Similarly, the target motion acceleration of the robot can be represented by the joint acceleration of the robot in the joint motion space.

In the following, the process of obtaining the target joint acceleration of the robot will be described in combination with the joint equality constraint sub-function, the joint inequality constraint sub-function and the joint threshold constraint sub-function.

First, after obtaining the target motion acceleration of the robot, for example, based on the dynamic equation and the contact constraint equation, an estimated value of the target motion acceleration of the robot is determined, which may be expressed as follows:

$$\hat{\alpha}_{t+1} = J_{t,i}\ddot{q}_{t+1} + \dot{J}_{t,i}\dot{q}_t \qquad \text{Equation (9-17)}$$

Where $\hat{\alpha}_{t+1}$ is the estimated value of the target motion acceleration of the robot, $J_{t,i}$ is a Jacobian matrix corresponding to each joint of the robot, $\ddot{q}_{t+1}$ is the joint acceleration of the robot at the target time, and $\dot{q}_t$ is the current joint velocity of the robot.

Based on the estimated value $\hat{\alpha}_{t+1}$ of the target motion acceleration of the robot and the target motion acceleration $\alpha_{t+1}$ of the robot, an error function of the robot may be further obtained. The error function $fw$ may be expressed as follows:

$$fw = \alpha_{t+1} - \hat{\alpha}_{t+1} = \alpha_{t+1} - (J_{t,i}\ddot{q}_{t+1} + \dot{J}_{t,i}\dot{q}_t) \qquad \text{Equation (9-18)}$$

Then, for example, the error function and the joint control constraint function can be solved simultaneously. The joint control constraint function includes Equations (9-8) and (9-10). The variable parameters $\ddot{q}_{t+1}$, $F_{c,t+1}$, $F_{\lambda,t+1}$, $\tau_{t+1}$ are adjusted, and the definition of each parameter is as described above. The parameters $F_{c,t+1}$, $F_{\lambda,t+1}$ and $\tau_{t+1}$ are associated with the parameter $\ddot{q}_{t+1}$. When the joint control constraint function is satisfied and the error function reaches a minimum value by adjusting the parameters $\ddot{q}_{t+1}$, $F_{c,t+1}$, $F_{\lambda,t+1}$, and $\tau_{t+1}$, the joint acceleration is determined as the target joint acceleration. In this way, the actual motion parameters of the robot can be regressed toward the target motion parameters.

By solving the error function and the joint control constraint function at the same time, according to the association relationship between the robot motion information and the joint motion information, the target motion acceleration obtained by the robot in the operating space is simply replaced to the joint space through the Jacobi matrix (since the joint space is generally defined as an unbounded space, and the operating space is a bounded space which is constrained by the actual dynamic equation and the own structure of the robot, such a simple replacement results in that the target joint acceleration in the mapped joint space meets the control requirement, but obviously deviates from or violates the motion principle of the normal motion of the robot and the physical constraint of the robot). Moreover, according to the constraint relationship between the robot motion information and the joint motion information provided by the joint control constraint function, it is ensured that the joint space acceleration obtained by replacing the target motion acceleration of the robot to the joint space still meets the physical constraint and the threshold condition defined by the dynamic model and the contact constraint equation of the robot. This is conducive to generation of the target joint acceleration with high reliability and precision, and avoids ineffective control.

Based on the above, in the present disclosure, by setting the joint equality constraint sub-function, the joint inequality constraint sub-function, and the joint threshold constraint sub-function for the robot, it can be better realized that the equality constraint relationship between the robot motion information and the joint motion information, the inequality constraint relationship between the robot motion information and the joint motion information, and the limit position or the limit pose of each joint of the robot during the motion of the robot, which improves precision and reliability of the generated target joint acceleration, thereby realizing flexible robot control.

In some embodiments, a robot is provided. The robot includes: a wheel-leg portion. The wheel-leg portion includes a left wheel-leg portion and a right wheel-leg portion. The left wheel-leg portion and the right wheel-leg portion each includes at least one joint. The robot further includes a controller. The controller is arranged on the robot, and is configured to perform the foregoing robot control method and has the foregoing functions.

The controller includes, for example, a processing apparatus. The processing apparatus may include a microprocessor, a digital signal processor ("DSP"), an application specific integrated circuit ("ASIC"), a field programmable gate array, a state machine, or other processing component for processing electrical signals received from a sensor line. Such processing component may include a programmable electronic device, such as a programmable logic controller ("PLC"), a programmable interrupt controller ("PIC"), a programmable logic device ("PLD"), a programmable read-only memory ("PROM"), an electronic programmable read-only memory, and the like.

In addition, in some embodiments, the robot may further include, for example, a base portion connected to the wheel-leg portion, an additional component (such as a tail component) arranged on the base portion, a bus, a memory, a sensor assembly, a communication module, an input/output apparatus, and the like. The robot may contain different components, additional components, or fewer components in various embodiments.

The bus may be a circuit that interconnects the components of the robot and transfers communication information (such as control messages or data) among the components.

The sensor component may be configured to sense the physical world, which includes a camera, an infrared sensor, an ultrasonic sensor, and the like. In addition, the sensor assembly may further include an apparatus for measuring a current operation and motion state of the robot, such as a Hall sensor, a laser position sensor, or a strain force sensor.

The communication module may, for example, be connected to a network via a wired or wireless connection, which facilitates communication with the physical world (such as a server). The communication module may be wireless and include a wireless interface, such as an IEEE 802.11, Bluetooth, a wireless local area network ("WLAN") transceiver, or a radio interface for accessing a cellular telephone network (such as a transceiver/antenna for accessing a code division multiple access (CDMA), a global system for mobile communications (GSM), a universal mobile telecommunications system (UMTS), or other mobile communication network). In another embodiment, the communication module may be wired and include an interface such as Ethernet, USB, or IEEE 1394.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The input/output apparatus may transmit, for example, commands or data inputted from a user or any other external device to one or more other components of the robot, or may output commands or data received from one or more other components of the robot to the user or other external device.

A plurality of robots may form a robot system, to cooperatively complete a task. The plurality of robots are communicatively connected to the server, and receive cooperative robot instructions from the server.

In some embodiments, a robot control system is provided. The robot includes a wheel-leg portion and a base portion connected to the wheel-leg portion. The wheel-leg portion includes at least one joint. The system includes: a motion instruction receiving module, configured to receive a motion instruction; and a control module, configured to control a torque of the at least one joint according to the motion instruction, to allow the robot to perform the somersault motion. In a takeoff phase of the somersault motion, a center of mass of the wheel-leg portion is lower than a center of mass of the base portion; in a flight phase of the somersault motion, there is a time at which the center of mass of the wheel-leg portion is higher than the center of mass of the base portion; and in a landing phase of the somersault motion, the center of mass of the wheel-leg portion is lower than the center of mass of the base portion.

In some embodiments, a wheel-legged robot is provided. The wheel-legged robot includes a processor and a memory. The memory stores at least one instruction, at least one program, a code set, or an instruction set. The at least one instruction, the at least one program, the code set, or the instruction set is loaded and executed by the processor to implement the foregoing method.

In some embodiments, a non-transitory computer-readable storage medium is provided. The storage medium stores at least one instruction, at least one program, a code set or an instruction set. The at least one instruction, the at least one program, the code set or the instruction set is loaded and executed by the processor to implement the foregoing method.

By using the method and apparatus for controlling a robot to perform a somersault motion, the robot, and the non-transitory computer-readable storage medium provided by the present disclosure, the somersault motion control of the robot is better realized, which allows the robot to stably and smoothly complete the somersault motion, thereby avoiding obstacles.

The program portion in the technology can be considered as a "product" or "article" in the form of executable codes and/or related data, which is realized with participation of a non-transitory computer-readable medium. A tangible and permanent storage medium may include an internal memory or a memory used by any computer, processor, or similar device or related module, for example, various types of semiconductor memories, tape drives, disk drives, or similar devices that are able to provide storage functions for software.

All or a part of software may communicate through a network, such as the Internet or other communication network. Such communication can load software from one computer device or processor to another one. Therefore, another medium capable of transmitting software elements may be used as a physical connection between local devices, such as light waves, radio waves, electromagnetic waves, and the like, and transmission is realized through a cable, ab optical cable, air, and the like. A physical medium for carrying waves, such as a cable, a wireless connection, or an optical cable, can be considered as a medium for carrying software. Herein, unless the tangible "storage" medium is restricted, any other term representing a computer or machine "readable medium" refer to a medium involved in the execution of any instruction by the processor.

The present disclosure uses terms to describe the embodiments of the present disclosure. For example, the terms "first/second embodiment", "one embodiment", and/or "some embodiments" refers to a feature, structure or characteristic associated with at least one embodiment of the present disclosure. The description "an embodiment" or "one embodiment" or "an alternative embodiment" may refer to the same, or a different embodiment. In addition, some features, structures or characteristics in one or more embodiments of the present disclosure may be appropriately combined.

Some embodiments of the present disclosure may be entirely executed by hardware, may be entirely executed by software (including firmware, resident software, microcode, and the like), or may be executed by a combination of hardware and software. The foregoing hardware or software may be referred to as "data block", "module", "engine", "unit", "component" or "system". In addition, some embodiments of the present disclosure may be embodied as computer products located in one or more non-transitory computer-readable mediums, the product including a computer-readable program code.

Unless otherwise defined, all terms (including technical and scientific terms) used herein have the same meaning as commonly understood by one of ordinary skill in the art to which the present disclosure belongs.

The above is description of the present disclosure, and is not to be considered as a limitation to the present disclosure. Although several example embodiments of the present disclosure are described, a person skilled in the art may easily understand that, many changes can be made to the described embodiments without departing from of the scope of the present disclosure. The above is a description of the present disclosure, and is not limited to the disclosed embodiments.

What is claimed is:

1. A method for controlling a robot, the method comprising:
   receiving a motion instruction for the robot, wherein the robot comprises a wheel-leg portion and a base portion connected to the wheel-leg portion via a joint; and
   controlling a torque of the joint according to the motion instruction to allow the robot to perform a somersault motion through a takeoff phase, a flight phase, and a landing phase;
   wherein:
      during the takeoff phase of the somersault motion, a center of mass of the wheel-leg portion is lower than a center of mass of the base portion,
      during the flight phase of the somersault motion, the center of mass of the wheel-leg portion is higher than the center of mass of the base portion at some point in time, and
      during the landing phase of the somersault motion, the center of mass of the wheel-leg portion is lower than the center of mass of the base portion;
   wherein the controlling the torque of the joint, during the takeoff phase, comprises:
      controlling the joint and an active wheel in the wheel-leg portion to allow a central axis of the robot to be inclined to a horizontal direction corresponding to a takeoff direction;
      controlling the active wheel to allow the robot to accelerate in a horizontal direction corresponding to the takeoff direction; and
      controlling the joint to allow the robot to accelerate in a vertical direction and in the horizontal direction corresponding to the takeoff direction; and
   wherein the controlling the torque of the joint, during the flight phase, comprises:
      controlling the joint to allow the robot to rotate in a rotational direction corresponding to the takeoff direction, wherein the center of mass of the wheel-leg portion is higher than the center of mass of the base portion at some point in the flight phase.

2. The method according to claim 1, wherein the controlling the torque of the joint, during the flight phase, further comprises:
   controlling the joint to shorten a distance between the center of mass of the wheel-leg portion and the center of mass of the base portion; and
   controlling the joint to increase the distance between the center of mass of the wheel-leg portion and the center of mass of the base portion.

3. The method according to claim 1, wherein the robot further comprises an additional component, the additional component and the base portion being connected at an additional joint, and wherein controlling the torque of the joint further comprises:
   controlling the additional joint to allow the additional component to rotate in the rotational direction corresponding to the takeoff direction.

4. The method according to claim 3, wherein the additional component comprises a link connected to an additional active wheel, and wherein during a rotation of the additional component, an angle between a central axis of the link and a perpendicular bisector of the base portion is gradually increased then gradually decreased along the rotational direction.

5. The method according to claim 1, wherein controlling the torque of the joint further comprises:
during the landing phase of the somersault motion, controlling the joint and an active wheel in the wheel-leg portion so the robot is in a balanced and upright state.

6. The method according to claim 1, wherein controlling the torque of the joint further comprises:
controlling the joint to allow a connecting line between a center of an active wheel in the wheel-leg portion and a center of the base portion to intersect with a perpendicular bisector of the base portion.

7. The method according to claim 1, wherein the motion instruction comprises target motion parameters corresponding to different times in the somersault motion of the robot.

8. The method according to claim 7, wherein the motion instruction is obtained according to whole-body dynamics planning, the whole-body dynamics planning corresponding to a dynamic model and a set of constraint equations of the robot, and wherein the dynamic model and the set of constraint equations of the robot are associated with a somersault initial target state and a somersault final target state.

9. The method according to claim 7, wherein controlling the torque of the joint further comprises:
determining a control signal for controlling the joint based on whole-body dynamics control and according to parameter differences between actual motion parameters of the robot in the somersault motion and the target motion parameters, to control the actual motion parameters of the robot towards the target motion parameters.

10. The method according to claim 9, wherein the whole-body dynamics control is based on a dynamic model corresponding to the robot, and the dynamic model is equivalent to one of the following:
a variable-leg-length wheeled inverted pendulum model, the variable-leg-length wheeled inverted pendulum model comprising: a virtual leg with a variable leg length, a virtual active wheel connected to a first end of the virtual leg, and a virtual base portion connected to a second end of the virtual leg, the virtual leg being equivalent to the joints and links in the wheel-leg portion, the virtual active wheel being equivalent to an active wheel in the wheel-leg portion, and the virtual base portion being equivalent to the base portion; or
a plane-with-floating-base whole-body dynamic model, the plane-with-floating-base whole-body dynamic model comprising: a virtual front leg, a virtual back leg, a virtual active wheel connected to a first end of the virtual front leg and a first end of the virtual back leg, and a virtual base portion connected to a second end of the virtual front leg and a second end of the virtual back leg, the virtual front leg and the virtual back leg being equivalent to the joints and links in the wheel-leg portion, the virtual active wheel being equivalent to an active wheel in the wheel-leg portion, and the virtual base portion being equivalent to the base portion.

11. The method according to claim 10, wherein the variable-leg-length wheeled inverted pendulum model and the plane-with-floating-base whole-body dynamic model further comprise a virtual tail, wherein the virtual tail is equivalent to an additional component.

12. The method according to claim 10, wherein,
the variable-leg-length wheeled inverted pendulum model is constructed based on at least one of the following: a center position of the virtual base portion, a rotated angle of the virtual active wheel, a leg length of the virtual leg, a pitch angle of the virtual base portion, an execution torque of the virtual active wheel, a force for changing the leg length of the virtual leg, a friction force, or a support force of a bearing surface to the variable-leg-length wheeled inverted pendulum model; and
the plane-with-floating-base whole-body dynamic model is constructed based on at least one of the following: a center position of the virtual base portion, a rotated angle of the virtual active wheel, a pose of the virtual front leg, a pose of the virtual back leg, a pitch angle of the virtual base portion, an execution torque of the virtual active wheel, a rotational torque at a connection between the virtual leg and the virtual base portion, a friction force, or a support force of the bearing surface to the plane-with-floating-base whole-body dynamic model.

13. The method according to claim 10, wherein the whole-body dynamics control is further based on a set of constraint equations corresponding to the robot, and the set of constraint equations comprises at least one of the following:
a motion state equation, configured to constrain a motion between the robot and a bearing surface during the takeoff phase and the landing phase to be pure rolling, and so that there is no interactive force between the robot and the bearing surface during the flight phase;
a friction constraint equation, configured to constrain a bearing surface reaction force to meet a friction cone;
an anti-collision constraint equation, configured to constrain mechanisms of the robot other than an active wheel from colliding with the bearing surface;
a boundary constraint equation, configured to constrain an upper limit value and a lower limit value of a state quantity of the robot, and an upper limit value and a lower limit value of a control quantity of the robot; or
a continuity constraint equation, configured to constrain an inelastic collision between the robot and the bearing surface during the landing phase.

14. The method according to claim 9, wherein the whole-body dynamics control is based on a set of constraint equations corresponding to the robot, and the set of constraint equations comprises: a joint control constraint, configured to constrain a relationship between a motion state corresponding to the robot and a motion state the joint.

15. A robot, comprising:
a wheel-leg portion;
a base portion connected to the wheel-leg portion via a joint; and
a controller configured to perform a method comprising:
receiving a motion instruction for the robot; and
controlling a torque of the joint according to the motion instruction to allow the robot to perform a somersault motion through a takeoff phase, a flight phase, and a landing phase;
wherein:
during the takeoff phase of the somersault motion, a center of mass of the wheel-leg portion is lower than a center of mass of the base portion,
during the flight phase of the somersault motion, the center of mass of the wheel-leg portion is higher than the center of mass of the base portion at some point in time, and
during the landing phase of the somersault motion, the center of mass of the wheel-leg portion is lower than the center of mass of the base portion;

wherein the controlling the torque of the joint, during the takeoff phase, comprises:
controlling the joint and an active wheel in the wheel-leg portion to allow a central axis of the robot to be inclined to a horizontal direction corresponding to a takeoff direction;
controlling the active wheel to allow the robot to accelerate in a horizontal direction corresponding to the takeoff direction; and
controlling the joint to allow the robot to accelerate in a vertical direction and in the horizontal direction corresponding to the takeoff direction; and
wherein the controlling the torque of the joint, during the flight phase, comprises:
controlling the joint to allow the robot to rotate in a rotational direction corresponding to the takeoff direction, wherein the center of mass of the wheel-leg portion is higher than the center of mass of the base portion at some point in the flight phase.

16. The robot according to claim 15, wherein the base portion connected to the wheel-leg portion via the joint comprises a left portion and a right portion, the left portion and the right portion each having a single wheel-leg configuration.

17. The robot according to claim 16, wherein the left portion comprises: a first left leg link, a second left leg link, a third left leg link and a fourth left leg link, wherein a first end portion of the first left leg link is connected with the base portion, a second end portion of the first left leg link is hinged with a first end portion of the second left leg link to form a first left leg revolute, a second end portion of the second left leg link is connected with a left active wheel, a first end portion of the third left leg link is connected with the left active wheel, a second end portion of the third left leg link is hinged with a first end portion of the fourth left leg link to form a second left leg revolute, and a second end portion of the fourth left leg link is connected with the base portion; and
the right portion comprises: a first right leg link, a second right leg link, a third right leg link and a fourth right leg link, wherein a first end portion of the first right leg link is connected with the base portion, a second end portion of the first right leg link is hinged with a first end portion of the second right leg link to form a first right leg revolute, a second end portion of the second right leg link is connected with a right active wheel, a first end portion of the third right leg link is connected with the right active wheel, a second end portion of the third right leg link is hinged with a first end portion of the fourth right leg link to form a second right leg revolute, and a second end portion of the fourth right leg link is connected with the base portion.

18. The robot according to claim 15, wherein the controlling the torque of the joint, during the flight phase, further comprises:

controlling the joint to shorten a distance between the center of mass of the wheel-leg portion and the center of mass of the base portion; and
controlling the joint to increase the distance between the center of mass of the wheel-leg portion and the center of mass of the base portion.

19. The robot according to claim 15, wherein controlling the torque of the joint further comprises:
controlling the joint to allow a connecting line between a center of an active wheel in the wheel-leg portion and a center of the base portion to intersect with a perpendicular bisector of the base portion.

20. A non-transitory computer readable storage medium, comprising processor executable instructions for performing a method for controlling a robot, the processor executable instructions, when executed by a processor, configured to cause the processor to:
receive a motion instruction for the robot, wherein the robot comprises a wheel-leg portion and a base portion connected to the wheel-leg portion via a joint; and
control a torque of the joint according to the motion instruction to allow the robot to perform a somersault motion through a takeoff phase, a flight phase, and a landing phase;
wherein:
during the takeoff phase of the somersault motion, a center of mass of the wheel-leg portion is lower than a center of mass of the base portion,
during the flight phase of the somersault motion, the center of mass of the wheel-leg portion is higher than the center of mass of the base portion at some point in time, and
during the landing phase of the somersault motion, the center of mass of the wheel-leg portion is lower than the center of mass of the base portion;
wherein the controlling the torque of the joint, during the takeoff phase, comprises:
controlling the joint and an active wheel in the wheel-leg portion to allow a central axis of the robot to be inclined to a horizontal direction corresponding to a takeoff direction;
controlling the active wheel to allow the robot to accelerate in a horizontal direction corresponding to the takeoff direction; and
controlling the joint to allow the robot to accelerate in a vertical direction and in the horizontal direction corresponding to the takeoff direction; and
wherein the controlling the torque of the joint, during the flight phase, comprises:
controlling the joint to allow the robot to rotate in a rotational direction corresponding to the takeoff direction, wherein the center of mass of the wheel-leg portion is higher than the center of mass of the base portion at some point in the flight phase.

* * * * *